US012388508B2

(12) United States Patent
Santhappan et al.

(10) Patent No.: US 12,388,508 B2
(45) Date of Patent: Aug. 12, 2025

(54) CPU, TIMING, AND CAPABILITY SPECIFICATIONS FOR eCSF REPORT BASED ON PROJECTED CLI IN FD

(71) Applicant: QUALCOMM Incorporated, San Diego, CA (US)

(72) Inventors: Thomas Valerrian Pasca Santhappan, San Diego, CA (US); Abdelrahman Mohamed Ahmed Mohamed Ibrahim, San Diego, CA (US); Muhammad Sayed Khairy Abdelghaffar, San Jose, CA (US); Ahmed Attia Abotabl, San Diego, CA (US); Huilin Xu, Temecula, CA (US); Seyedkianoush Hosseini, San Diego, CA (US); Krishna Kiran Mukkavilli, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 519 days.

(21) Appl. No.: 17/662,646

(22) Filed: May 9, 2022

(65) Prior Publication Data

US 2023/0361840 A1    Nov. 9, 2023

(51) Int. Cl.
*H04B 7/06* (2006.01)
*H04B 7/0417* (2017.01)
(Continued)

(52) U.S. Cl.
CPC ......... *H04B 7/0639* (2013.01); *H04B 7/0417* (2013.01); *H04B 7/0626* (2013.01);
(Continued)

(58) Field of Classification Search
CPC .. H04B 7/0639; H04B 7/0417; H04B 7/0626; H04L 27/26025; H04L 5/0051; H04L 27/2613
(Continued)

(56) References Cited

U.S. PATENT DOCUMENTS

2021/0067991 A1    3/2021  Zhu et al.
2021/0360449 A1*  11/2021  Kim ....................... H04W 76/15
(Continued)

FOREIGN PATENT DOCUMENTS

WO        2022021362 A1    2/2022

OTHER PUBLICATIONS

International Search Report and Written Opinion—PCT/US2023/015412—ISA/EPO—Jun. 7, 2023.

*Primary Examiner* — Nicholas R Taylor
*Assistant Examiner* — Chong G Kim
(74) *Attorney, Agent, or Firm* — Procopio, Cory, Hargreaves & Savitch LLP

(57) ABSTRACT

A UE may estimate a CLI channel state based on a ZP-SRS from a second UE. A network node may transmit to the UE, and the UE may receive from the network node, a CSI-RS. The UE may estimate a downlink channel state based on the CSI-RS from the network node. The UE may estimate one or more eCSF parameters based on the CLI channel state, the downlink channel state, two or more interference hypotheses, and at least one of a CPU specification, a timing specification, or a UE capability indication. The UE may transmit to the network node, and the network node may receive from the UE, an eCSF report based on the one or more eCSF parameters.

30 Claims, 16 Drawing Sheets

(51) Int. Cl.
  *H04L 5/00* (2006.01)
  *H04L 27/26* (2006.01)
(52) U.S. Cl.
  CPC ...... *H04L 5/0051* (2013.01); *H04L 27/26025* (2021.01); *H04L 27/2613* (2013.01)
(58) Field of Classification Search
  USPC .......................................................... 370/329
  See application file for complete search history.

(56) References Cited

U.S. PATENT DOCUMENTS

| | | | |
|---|---|---|---|
| 2022/0231808 A1* | 7/2022 | Oh ....................... | H04L 25/0224 |
| 2023/0090986 A1* | 3/2023 | Jang ........................ | H04W 8/22 |
| | | | 370/329 |
| 2023/0319605 A1* | 10/2023 | Park ........................ | H04J 11/00 |
| | | | 370/252 |

* cited by examiner

US 12,388,508 B2

CPU, TIMING, AND CAPABILITY SPECIFICATIONS FOR eCSF REPORT BASED ON PROJECTED CLI IN FD

TECHNICAL FIELD

The present disclosure relates generally to communication systems, and more particularly, to channel state feedback from a full-duplex user equipment (UE) in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may estimate a cross-link interference (CLI) channel state based on a zero power (ZP)—sounding reference signal (SRS) (ZP-SRS) from a second UE. The apparatus may estimate a downlink channel state based on a channel state information (CSI)—reference signal (RS) (CSI-RS) from a network node. The apparatus may estimate one or more enhanced channel state feedback (eCSF) parameters based on the CLI channel state, the downlink channel state, two or more interference hypotheses, and at least one of a CSI processing unit (CPU) specification, a timing specification, or a UE capability indication. The apparatus may transmit, to the network node, an eCSF report based on the one or more eCSF parameters.

In an aspect of the disclosure, a method, a computer-readable medium, and an apparatus are provided. The apparatus may be a network node. The apparatus may transmit, to a UE, a CSI-RS. The apparatus may receive, from the UE, an eCSF based on one or more eCSF parameters. The one or more eCSF parameters may be based on a CLI channel state, a downlink channel state, two or more interference hypotheses, and at least one of a CPU specification, a timing specification, or a UE capability indication. The CLI channel state may be based on a ZP-SRS from a second UE. The downlink channel state may be based on the CSI-RS.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
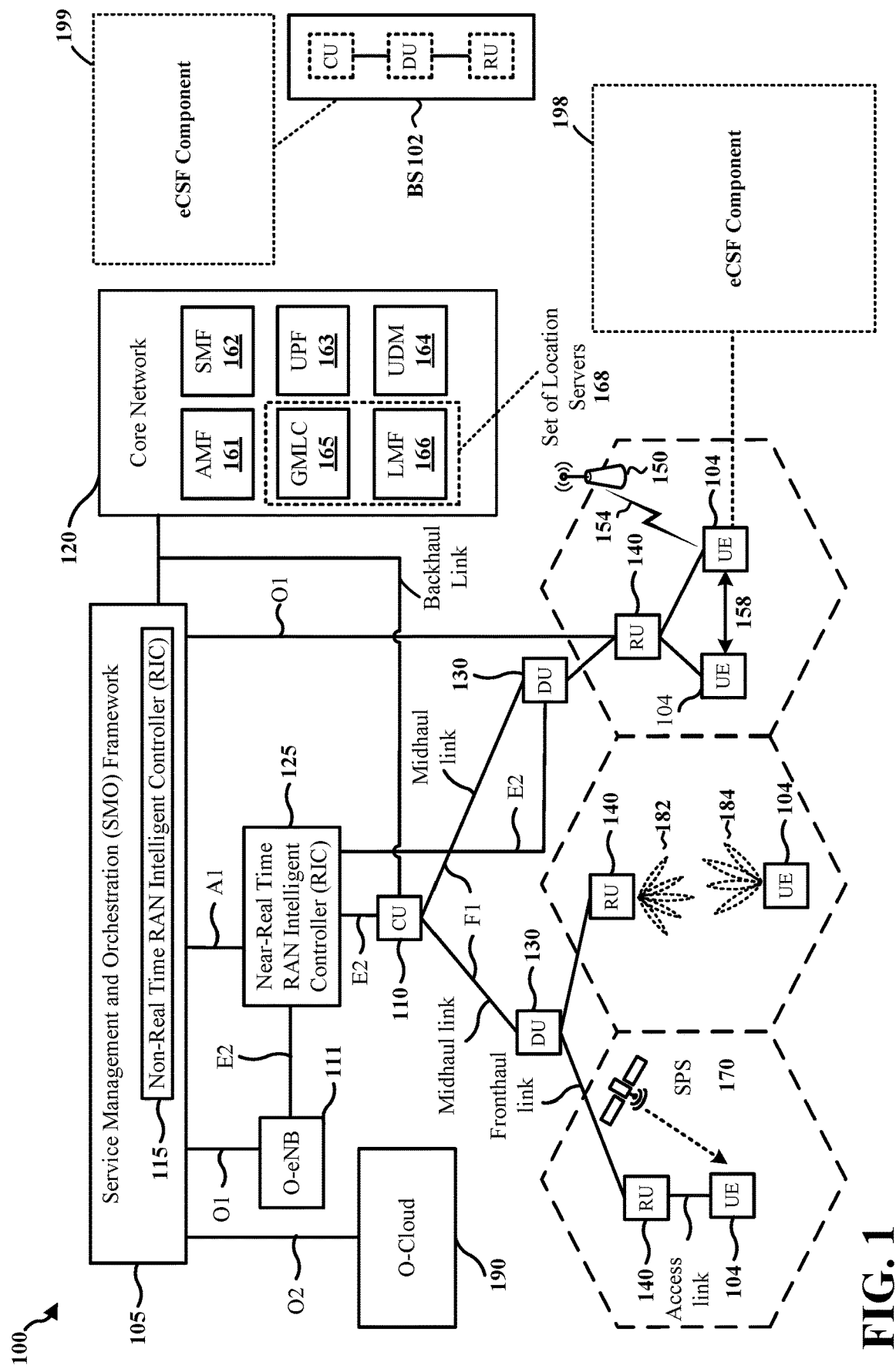
FIG. 1 is a diagram illustrating an example of a wireless communications system and an access network.

To provide an eCSF report, the CLI channel and one or more interference hypotheses may be considered in the computation of the eCSF report. Computing the spectral efficiency for more than one interference hypothesis may lead to increased processing time for the CSI report. Accordingly, new specifications including new CPU specifications and new timing specifications, as well as signaling of the new UE capability related to the eCSF, may be provided. According to one or more aspects, a UE may estimate a CLI channel state based on a ZP-SRS from a second UE. A network node may transmit to the UE, and the UE may receive from the network node, a CSI-RS. The UE may estimate a downlink channel state based on the CSI-RS from the network node. The UE may estimate one or more eCSF parameters based on the CLI channel state, the downlink channel state, two or more interference hypotheses, and at least one of a CPU specification, a timing specification, or a UE capability indication. The UE may transmit to the network node, and the network node may receive from the UE, an eCSF report based on the one or more eCSF parameters. Accordingly, the eCSF may be enabled where the impact of the transmitted precoding matrix indicator (TPMI) chosen by the aggressor UE is taken into consideration in the computation of the eCSF report.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units, application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution. Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (MC) 125 via an E2 link, or a Non-Real Time (Non-RT) MC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an eCSF component 198 that may be configured to estimate a CLI channel state based on a ZP-SRS from a second UE. The eCSF component 198 may be configured to estimate a downlink channel state based on a CSI-RS from a network node. The eCSF component 198 may be configured to estimate one or more eCSF parameters based on the CLI channel state, the downlink channel state, two or more interference hypotheses, and at least one of a CPU specification, a timing specification, or a UE capability indication. The eCSF component 198 may be configured to transmit, to the network node, an eCSF report based on the one or more eCSF parameters. In certain aspects, the base station 102 may include an eCSF component 199 that may be configured to transmit, to a UE, a CSI-RS. The eCSF component 199 may be configured to receive, from the UE, an eCSF based on one or more eCSF parameters. The one or more eCSF parameters may be based on a CLI channel state, a downlink channel state, two or more interference hypotheses, and at least one of a CPU specification, a timing specification, or a UE capability indication. The CLI channel state may be based on a ZP-SRS from a second UE. The downlink channel state may be based on the CSI-RS. Although the following description may be focused on 5G NR, the concepts described herein may be applicable to other similar areas, such as LTE, LTE-A, CDMA, GSM, and other wireless technologies.

Figure 2:
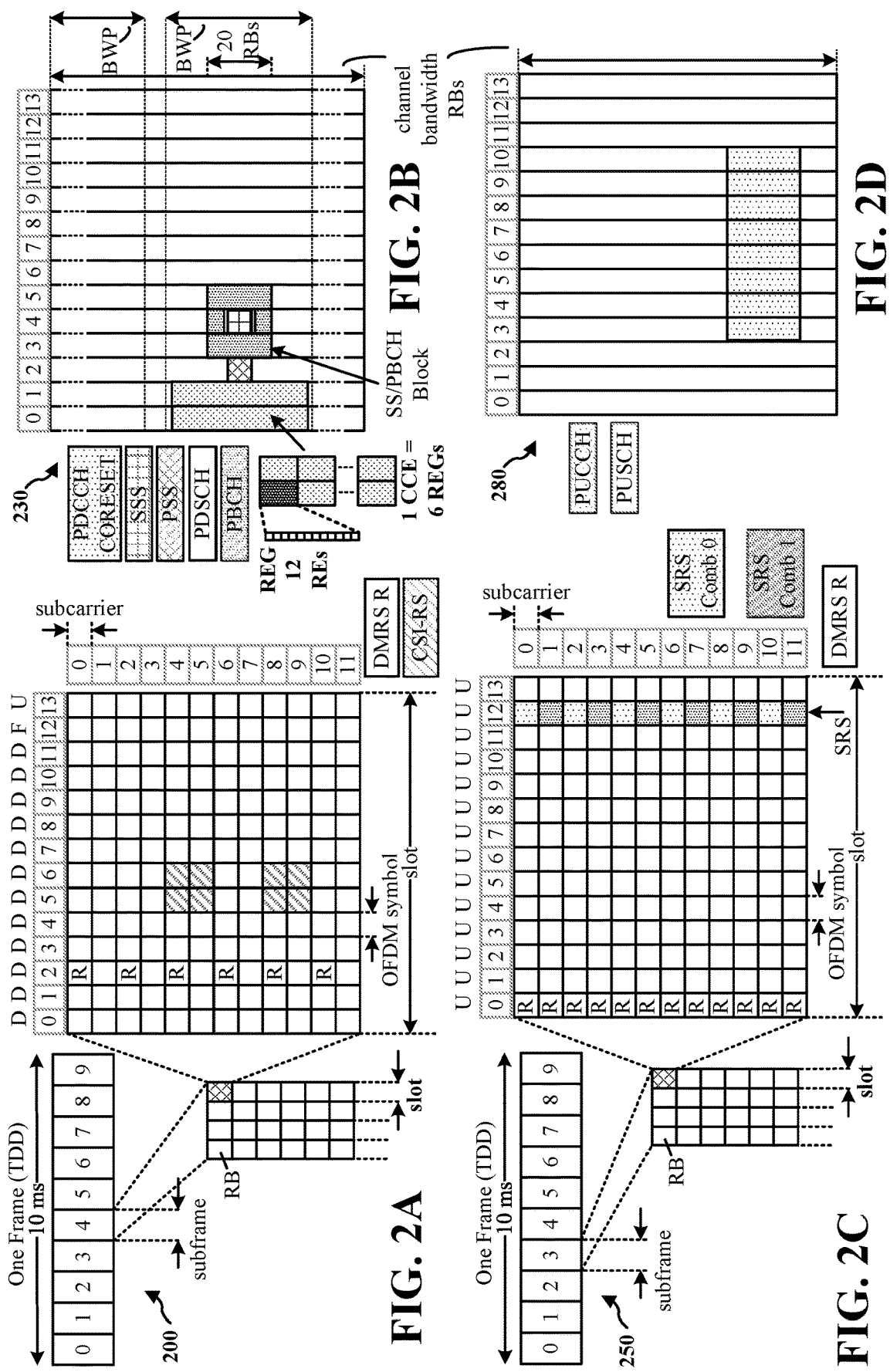
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
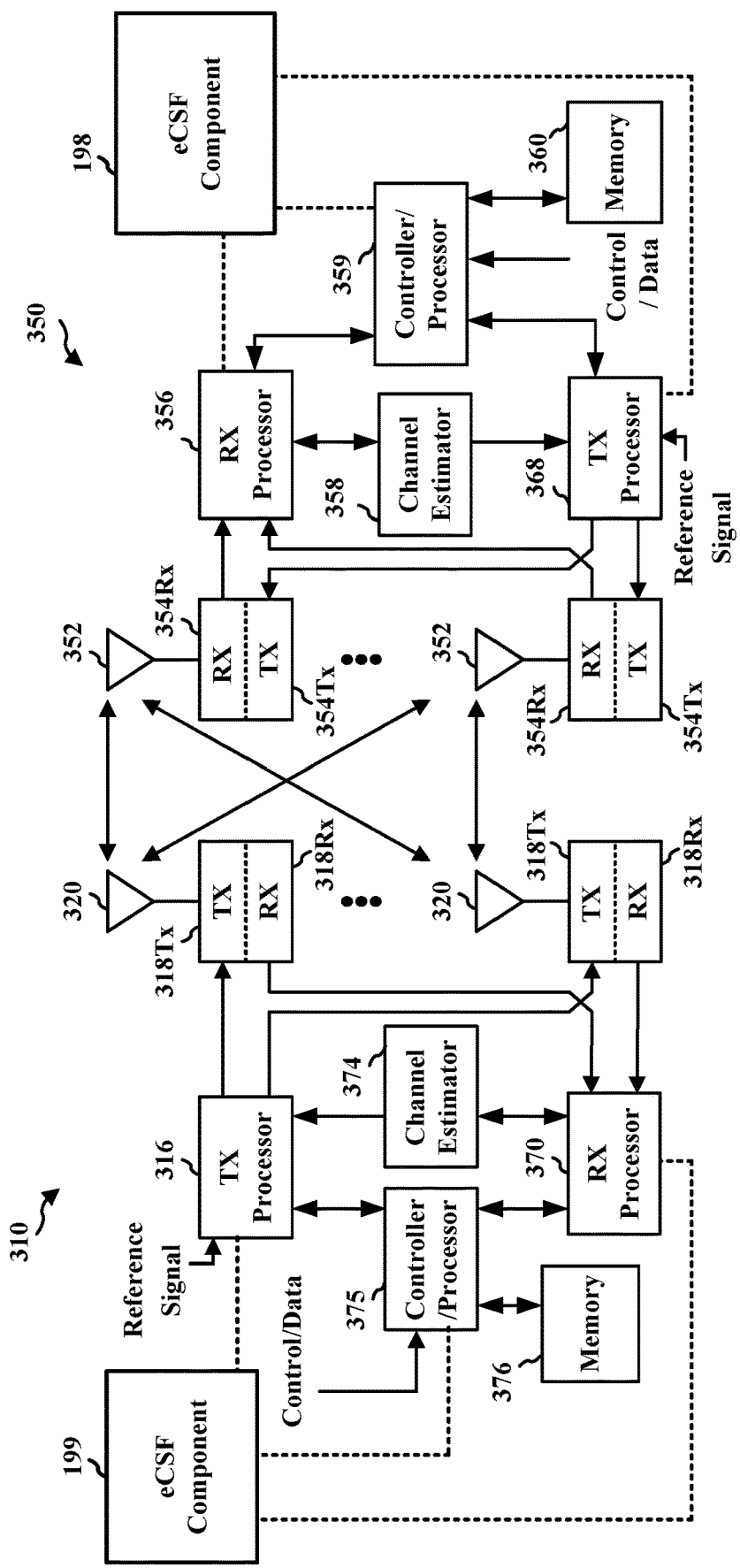
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the eCSF component 198 of FIG. 1.

At least one of the TX processor 316, the RX processor 370, and the controller/processor 375 may be configured to perform aspects in connection with the eCSF component 199 of FIG. 1.

Full duplex communication may be in a same frequency band. The uplink and downlink communication may be in different frequency sub-bands, in the same frequency sub-band, or in partially overlapping frequency sub-bands.

Figure 4:
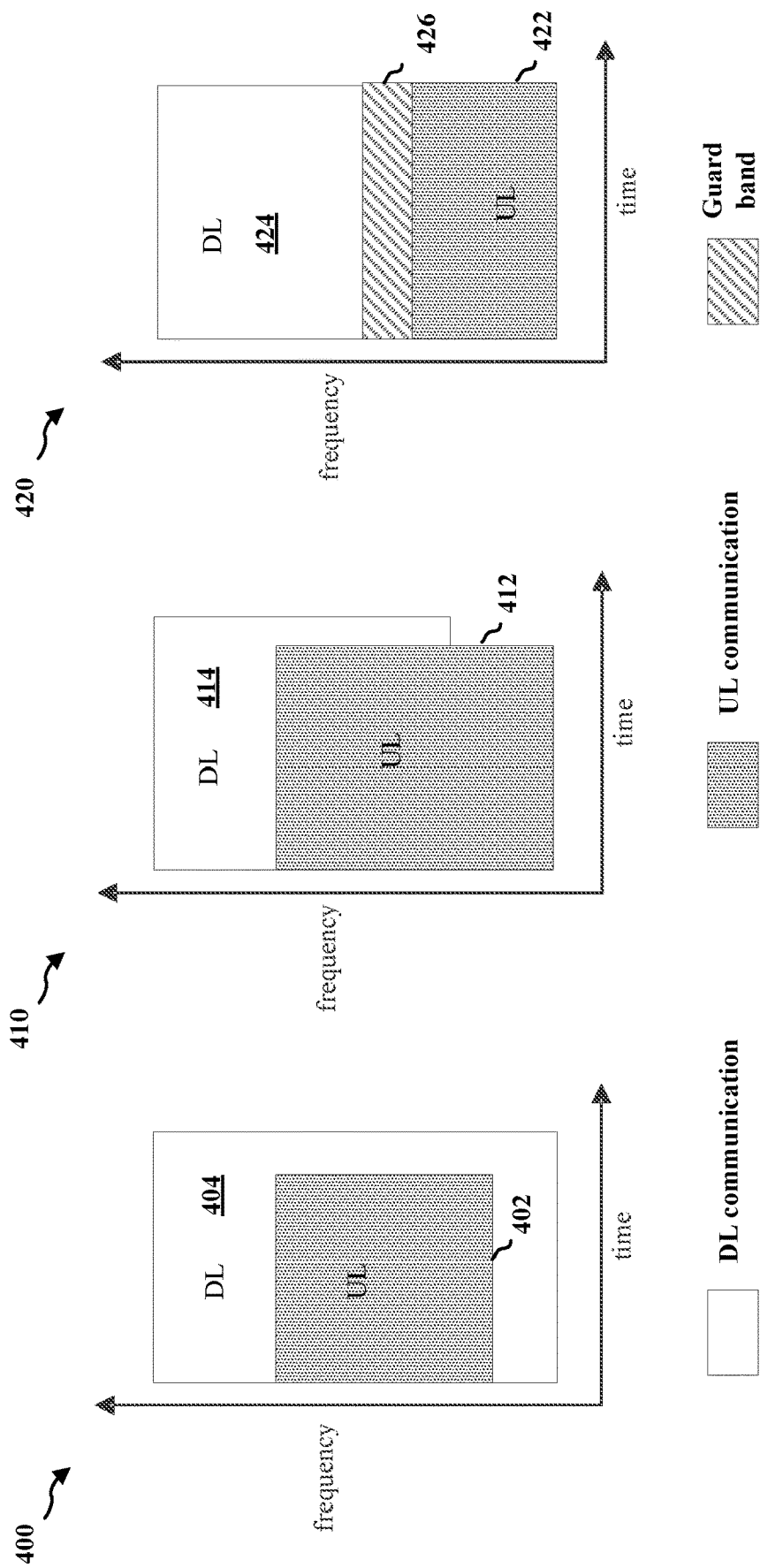
FIG. 4 illustrates examples of in-band full duplex (IBFD) resources and sub-band frequency division duplex (FDD) resources for full duplex communication.

FIG. 4 illustrates a first example 400 and a second example 410 of in-band full duplex (IBFD) resources and a third example 420 of sub-band full-duplex resources. In IBFD, signals may be transmitted and received in overlapping times and overlapping in frequency. As shown in the first example 400, a time and a frequency allocation of a UL resources 402 may fully overlap with a time and a frequency allocation of DL resources 404. In the second example 410, a time and a frequency allocation of UL resources 412 may partially overlap with a time and a frequency of allocation of DL resources 414.

IBFD is in contrast to sub-band frequency division duplex (FDD), where uplink and downlink resources may overlap in time using different frequencies, as shown in the third example 420. In the third example 420, the UL resources 422 are separated from the DL resources 424 by a guard band 426. The guard band may be frequency resources, or a gap in frequency resources, provided between the UL resources 422 and the DL resources 424. Separating the UL frequency resources and the DL frequency resources with a guard band may help to reduce self-interference (SI). UL resources and DL resources that are immediately adjacent to each other correspond to a guard band width of 0. As an output signal, e.g., from a UE transmitter may extends outside the UL resources, the guard band may reduce interference experienced by the UE. Sub-band FDD may also be referred to as "flexible duplex."

Figure 5:
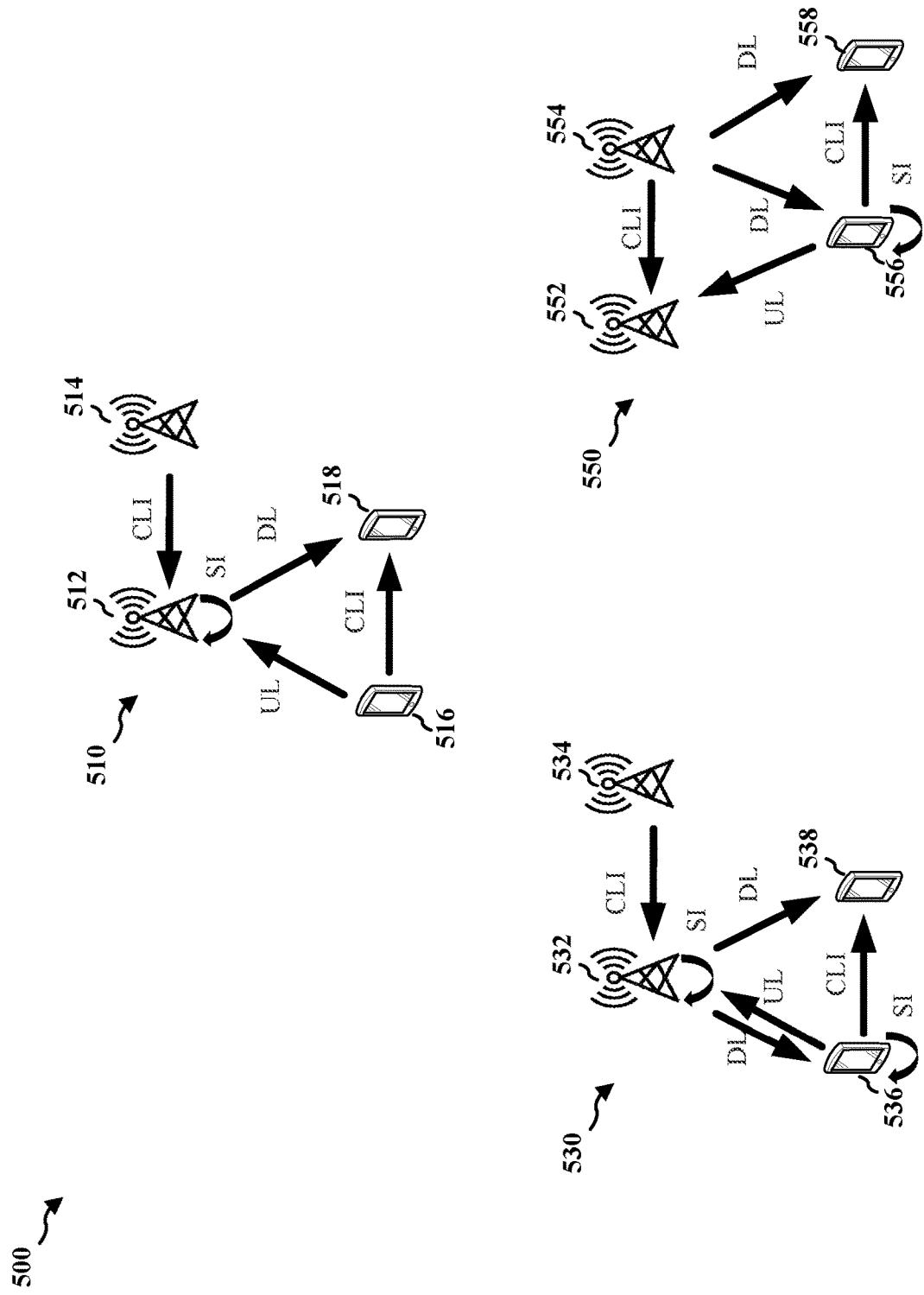
FIG. 5 is a diagram illustrating various example deployment scenarios including one or more full-duplex devices.

FIG. 5 is a diagram 500 illustrating various example deployment scenarios including one or more full-duplex devices. A full-duplex device (or a device working in a full-duplex mode) may transmit and receive at the same time. The diagram 510 illustrates an example deployment scenario including at least one full-duplex network node and two half-duplex UEs. Operating in the full-duplex mode, a first network node 512 may transmit to a second UE 518 and receive from a first UE 516 at the same time. The full-duplex operation may create SI at the first network node 512. In particular, at the first network node 512, the downlink transmission to the second UE 518 may cause interference to the uplink reception from the first UE 516. Further, the uplink transmission by the first UE 516 to the first network node 512 may cause CLI to the downlink reception by the second UE 518 from the first network node 512. Moreover, a transmission from a second network node 514 may cause CLI to the uplink reception at the first network node 512.

The diagram 530 illustrates an example deployment scenario including at least one full-duplex network node and at least one full-duplex UE/customer premises equipment (CPE). A first network node 532 may communicate with a first UE/CPE 536 in the full-duplex mode. In other words, uplink and downlink transmissions may take place at the same time between the first network node 532 and the first UE/CPE 536. At the same time, the first network node 532 may transmit to a second UE/CPE 538. The downlink transmissions to both the first UE/CPE 536 and the second UE/CPE 538 may cause SI to the uplink reception from the first UE/CPE 536 at the first network node 532. Further, the uplink transmission from the first UE/CPE 536 may cause SI to the downlink reception at the first UE/CPE 536, and may cause CLI to the downlink reception at the second UE/CPE 538. Moreover, a transmission from a second network node 534 may cause CLI to the uplink reception at the first network node 532.

The diagram 550 illustrates an example deployment scenario including two half-duplex network nodes (or two transmit receive points (TRPs) that together may act as a full-duplex network node) and at least one full-duplex UE/CPE. A first UE/CPE 556 may work in the full-duplex mode. In particular, the first UE/CPE 556 may transmit to a first network node 552 and receive from a second network node 554 at the same time. Accordingly, the uplink transmission from the first UE/CPE 556 to the first network node 552 may cause SI to the downlink reception at the first UE/CPE 556. Further, the second network node 554 may transmit to a second UE/CPE 558 at the same time the second network node 554 transmits to the first UE/CPE 556. The downlink transmissions from the second network node 554 to both the first UE/CPE 556 and the second UE/CPE 558 may cause CLI to the uplink reception at the first network node 552. Further, the uplink transmission from the first UE/CPE 456 to the first network node 552 may cause CLI to the downlink reception at the second UE/CPE 558.

Figure 6:
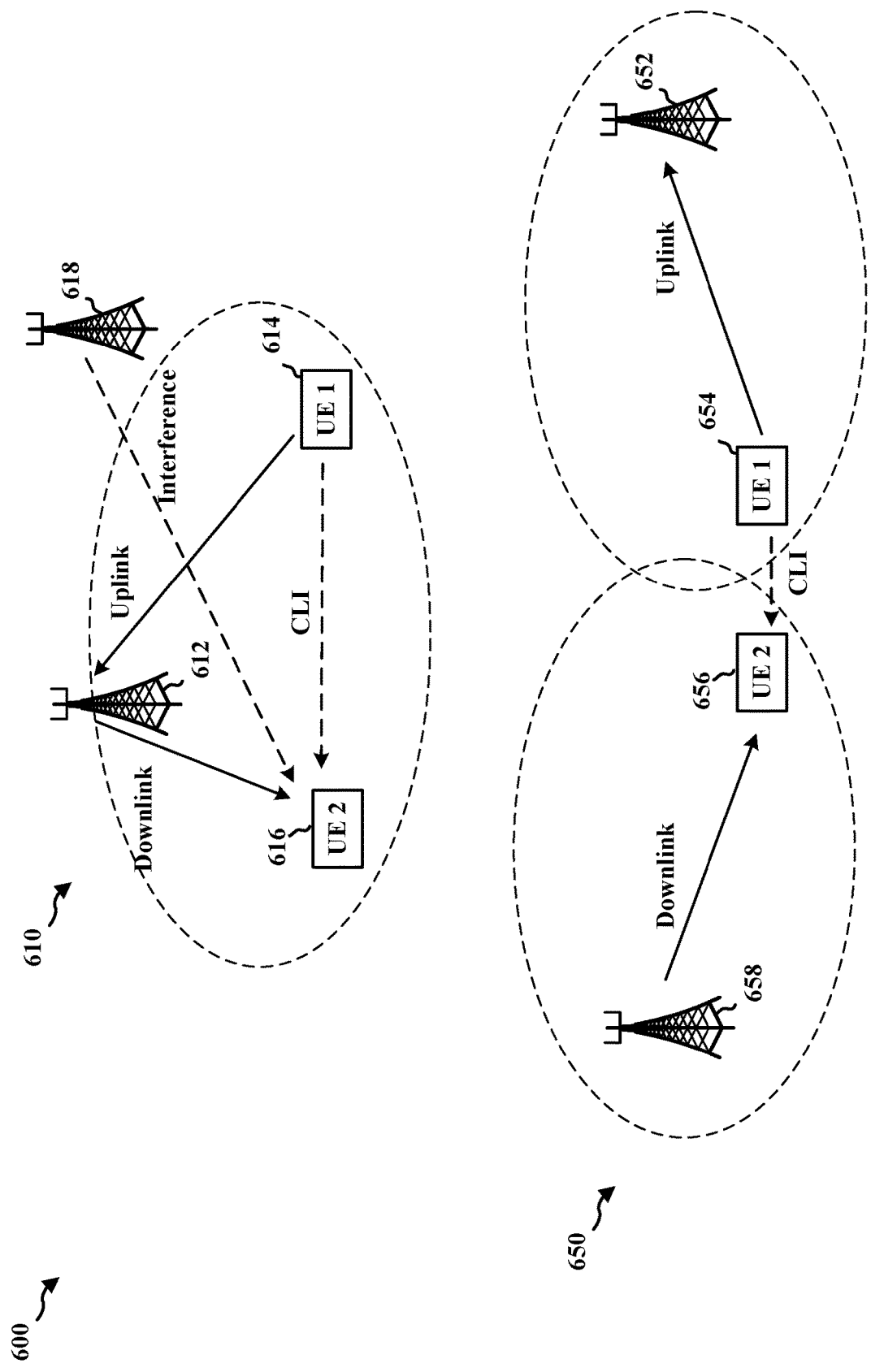
FIG. 6 is a diagram illustrating examples scenarios where a UE may experience interference.

FIG. 6 is a diagram 600 illustrating examples scenarios where a UE may experience interference. In the scenario illustrated in the diagram 610, the first UE 614 and the second UE 616, which may be located in the same cell corresponding to the first network node 612, may operate in the half-duplex mode. Further, the first network node 612 may operate in the full-duplex mode (either IBFD or sub-band FDD). As illustrated in the diagram 610, the uplink transmission from the first UE 614 to the first network node 612 may cause intra-cell CLI to the downlink reception at the second UE 616 from the first network node 612 (even with sub-band FDD, the CLI may occur due to leakage). Further, the second UE 616 may also experience inter-cell interference from the second network node 618. Accordingly, between the first UE 614 and the second UE 616, the first UE 614 may be the aggressor UE and the second UE 616 may be the victim UE.

In the scenario illustrated in in the diagram 650, the first UE 654 and the second UE 656, which may be located in different, adjacent cells corresponding to the first network node 652 and the second network node 658, respectively, may operate in the half-duplex mode. The first network node 652 and the second network node 658 may be associated with a same operator, or may be associated with different operators. As illustrated in the diagram 650, the uplink transmission from the first UE 654 to the first network node 652 may cause inter-cell CLI to the downlink reception at the second UE 656 from the second network node 658. Accordingly, between the first UE 654 and the second UE 656, the first UE 654 may be the aggressor UE and the second UE 656 may be the victim UE.

Furthermore, as explained above, a UE operating in the full-duplex mode may experience SI.

Figure 7:
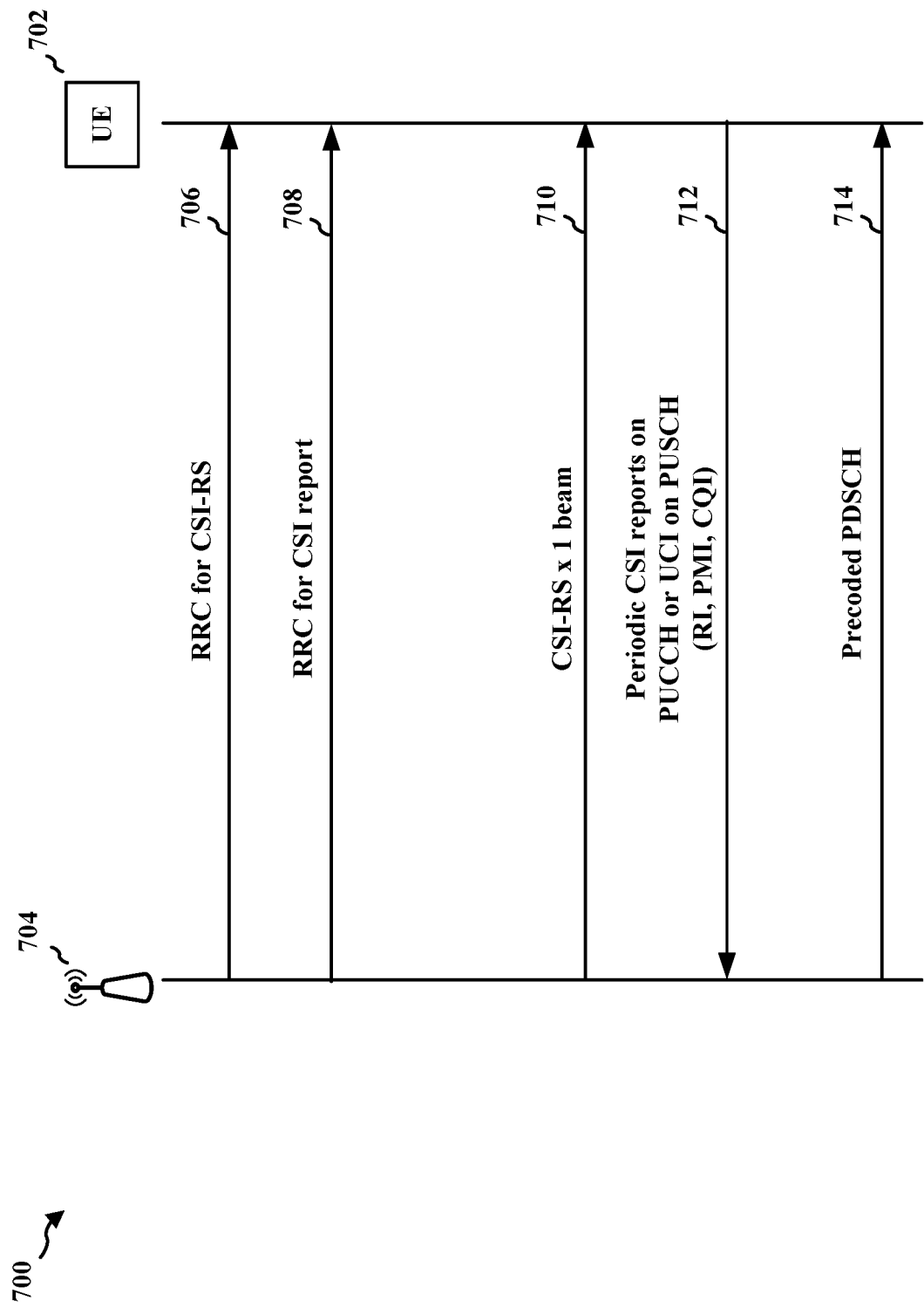
FIG. 7 is a flowchart illustrating an example process associated with codebook-based downlink adaptation.

FIG. 7 is a flowchart illustrating an example process 700 associated with codebook-based downlink adaptation. At 706, the network node 704 may transmit, to the UE 702, and the UE 702 may receive, from the network node 704, an RRC message for scheduling a CSI-RS. At 708, the network node 704 may transmit, to the UE 702, and the UE 702 may receive, from the network node 704, an RRC message for scheduling a CSI report (A CSI report may also be referred to hereinafter as a channel state feedback (CSF)). At 710, the network node 704 may transmit, to the UE 702, and the UE 702 may receive, from the network node 704, a CSI-RS. The CSI-RS may correspond to a single beam. At 712, the UE 702 may transmit, to the network node 704, and the network node 704 may receive, from the UE 702, periodic CSI reports. The CSI reports may be transmitted via PUCCHs or UCIs on PUSCHs. Each CSI report may include at least one of an RI, a PMI, or a CQI. Therefore, the PMI may indicate to the network node 704 a UE 702-selected precoding matrix for downlink transmissions (e.g., PDSCH transmissions). Accordingly, at 714, the network node 704 may transmit, to the UE 702, and the UE 702 may receive, from the network node 704, a PDSCH that has been precoded at the network node 704 using the UE 702-selected precoding matrix.

In various configurations, REs carrying a reference signal may be configured as either ZP or non-zero power (NZP). Accordingly, for example, an SRS carried in ZP REs may be referred to as a ZP-SRS, a CSI-RS carried in NZP REs may be referred to as an NZP-CSI-RS, and so on.

Figure 8:
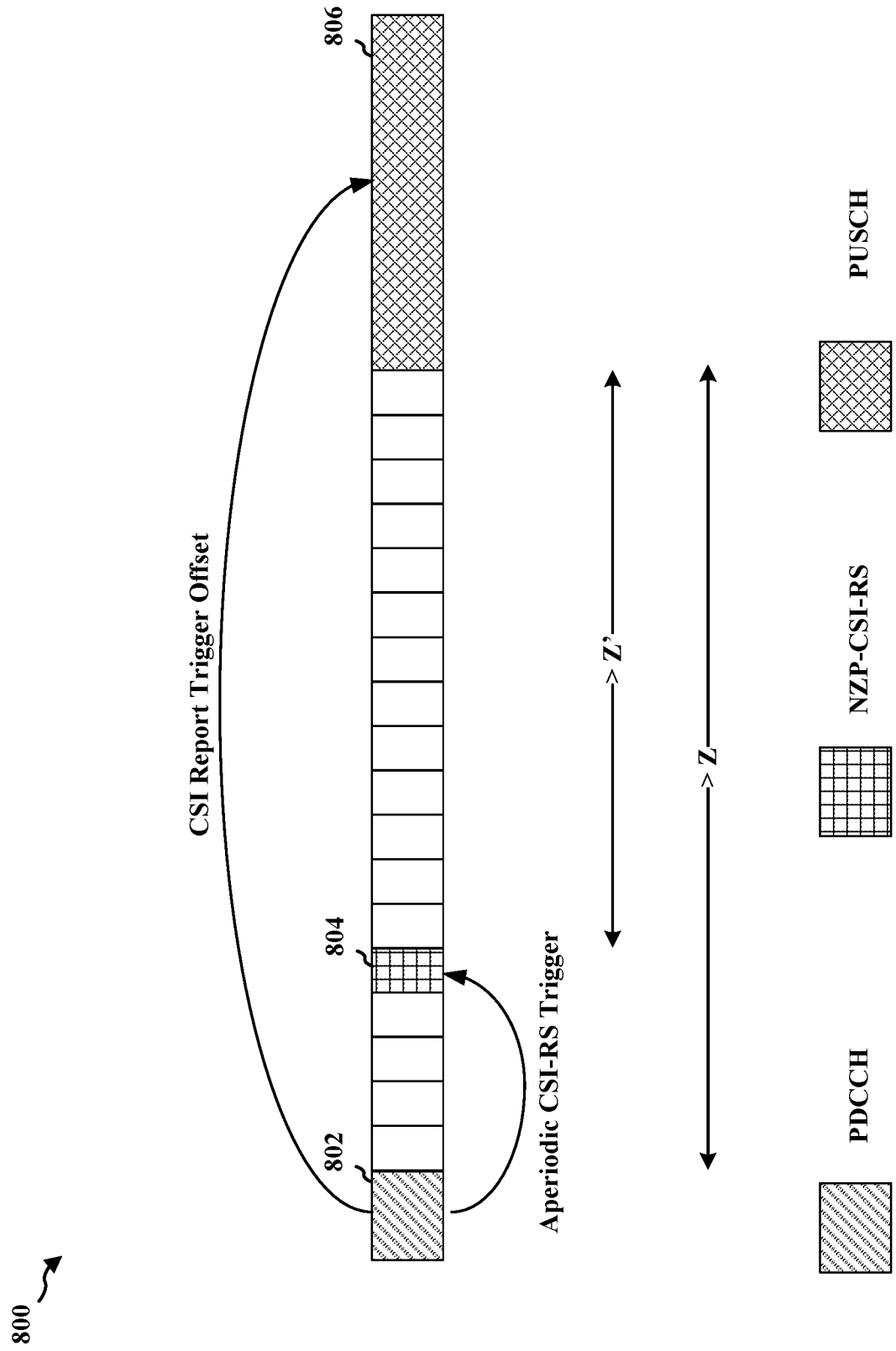
FIG. 8 is a diagram illustrating example timing specifications associated with the CSF.

FIG. 8 is a diagram 800 illustrating example timing specifications associated with the CSF. In some configurations, certain timing specifications associated with CSI processing may be met in order to guarantee that the UE has sufficient time to generate the CSI report. As illustrated in FIG. 8, the PDCCH 802 may schedule/trigger the CSI-RS 804 (e.g., an NZP-CSI-RS) (e.g., the CSI-RS at 710 in FIG. 7) and the CSI report carried in the PUSCH 806 (e.g., the PUSCH at 712 in FIG. 7). In some configurations, a minimum delay of Z may be specified for the delay between the PDCCH 802 and the PUSCH 806. Further, another minimum delay of Z' may be specified for the delay between the CSI-RS 804 and the PUSCH 806.

For example, Table 1 below shows example timing specifications (Z/Z') for some configurations where ultra-low latencies are to be supported. Further, Table 2 below shows example timing specifications (Z/Z') for three different latency classes for some configurations. In particular, the timing specifications $Z_1/Z_1'$ may correspond to a low-latency class. The timing specification $Z_2/Z_2'$ may correspond to a high-latency class. Further, the timing specification $Z_3/Z_3'$ may correspond to a latency class specific to beam reporting, where min( ) may be the minimum function, and $X_i$ may be based on the reported UE capability.

TABLE 1

CSI computation delay specification (ultra-low latency)

| | $Z_1$ [symbols] | |
| μ | $Z_1$ | $Z_1'$ |
| --- | --- | --- |
| 0 | 10 | 8 |
| 1 | 13 | 11 |
| 2 | 25 | 21 |
| 3 | 43 | 36 |

TABLE 2

CSI computation delay specification

| | $Z_1$ [symbols] | | $Z_2$ [symbols] | | $Z_3$ [symbols] | |
| μ | $Z_1$ | $Z_1'$ | $Z_2$ | $Z_2'$ | $Z_3$ | $Z_3'$ |
| --- | --- | --- | --- | --- | --- | --- |
| 0 | 22 | 16 | 40 | 37 | 22 | $X_0$ |
| 1 | 33 | 30 | 72 | 69 | 33 | $X_1$ |
| 2 | 44 | 42 | 141 | 140 | min(44, $X_2$ + $KB_1$) | $X_2$ |
| 3 | 97 | 85 | 152 | 140 | min(97, $X_3$ + $KB_2$) | $X_3$ |
| 5 | 388 | 340 | 608 | 560 | min(388, $X_5$ + $KB_3$) | $X_5$ |
| 6 | 776 | 680 | 1216 | 1120 | min(776, $X_6$ + $KB_4$) | $X_6$ |

In some configurations, a UE may be associated with certain UE features or capabilities in relation to CSI-RS and CSI—inference measurement (IM) (CSI-IM) reception for the CSF. The UE may transmit an indication of the UE features to the network, so that the network node may provide the CSI-RS accordingly. The UE features in relation to CSI-RS and CSI-IM reception for the CSF may include, for example, one or more of a supported maximum number of configured NZP-CSI-RS resources per component carrier (CC) ("maxConfigNumberNZP-CSI-RS-PerCC") (candidate values may be {1, 2, 3, . . . , 32}), a supported maximum number of ports across all configured NZP-CSI-RS resources per CC ("maxConfigNumberPortsAcrossNZP-CSI-RS-PerCC") (candidate values may be {2, 4, 8, 12, 16, 24, 32, 40, 48, . . . , 256}), a supported maximum number of configured CSI-IM resources per CC ("maxConfigNumberCSI-IM-PerCC") (candidate values may be {1, 2, 4, 8, 16, 32}), a supported maximum number of simultaneous NZP-CSI-RS resources in active BWPs across all CCs ("maxNumberSimultaneousNZP-CSI-RS-ActBWP-AllCC") (candidate values may be {5, 6, 7, 8, 9, 10, 12, 14, 16, . . . , 62, 64} (just even numbers between 16 and 64)), a supported maximum number of simultaneous NZP-CSI-RS resources per CC ("maxNumberSimultaneousNZP-CSI-RS-PerCC") (candidate values may be {1, 2, 3, . . . , 32}), a supported maximum total number of CSI-RS ports in simultaneous NZP-CSI-RS resources in active BWPs across all CCs ("totalNumberPortsSimultaneousNZP-CSI-RS-ActBWP-AllCC") (candidate values may be {8, 16, 24, . . . , 248, 256}), or a supported maximum total number of CSI-RS ports in simultaneous NZP-CSI-RS resources per CC ("totalNumberPortsSimultaneousNZP-CSI-RS-PerCC") (candidate values may be {8, 16, 24, . . . , 128}).

For the codebook-based operation, a network node may optimize the PMI selection for the downlink of victim UEs and the transmitted PMI (TPMI) selection for aggressor UEs to minimize the impact of inter-UE CLI. In some configurations, the CSF (e.g., PMI, RI, CQI, etc.) may be enhanced to take into account the precoder choice (i.e., a TPMI choice) at the aggressor UE and the impact of the aggressor UE precoder choice on the inter-UE CLI because the optimal choice for the downlink CSF parameters may be dependent on the TPMI choice at the aggressor UE.

Figure 9:
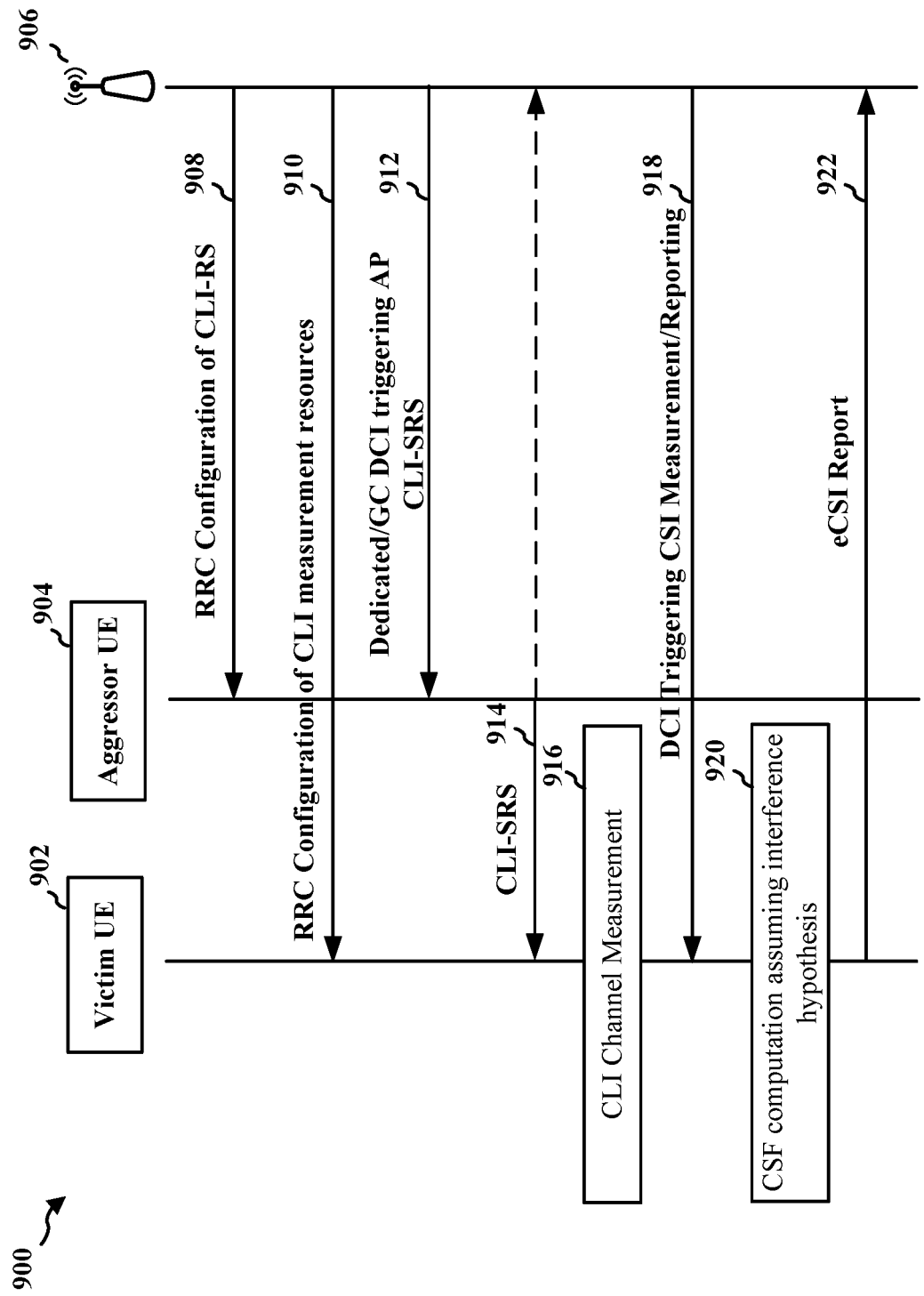
FIG. 9 is a flowchart illustrating an example process in relation to the eCSF based on the projected CLI.

FIG. 9 is a flowchart illustrating an example process 900 in relation to the eCSF based on the projected CLI. At 908, the network node 906 may configure the aggressor UE 904, via an RRC message, with a multi-port CLI-SRS for sounding (e.g., measuring) the CLI channel. At 910, the network node 906 may configure the victim UE 902, via an RRC message, with CLI measurement resources. At 912, the network node 906 may schedule, via a DCI message (either dedicated or group common (GC)), the transmission of aperiodic CLI-SRSs from the aggressor UE 904. At 914, the aggressor UE 904 may transmit the CLI-SRS (e.g., a ZP-SRS, which may not be precoded). The victim UE 902 may receive the CLI-SRS transmitted by the aggressor UE 904. At 916, the victim UE 902 may perform the CLI channel measurement using the CLI-SRS (ZP-SRS) to obtain an estimated CLI channel "H_cli." At 918, the network node 906 may schedule the victim UE 902, via a DCI message, for the CSI measurement and the CSI reporting. Further, the network node 906 may transmit a CSI-RS to the victim UE 902 for the CSF. At 920, the victim UE 902 may find the CSF parameters using the estimated downlink channel "H" (which may be estimated based on the CSI-RS) and the estimated CLI channel "H_cli." At 922, the victim UE 902 may transmit, to the network node 906, an enhanced CSI (eCSI) report (which may also be referred to as an eCSF or an eCSF report). In some configurations, one or more inference hypotheses may be used to generate the eCSI report 922. Each inference hypothesis may correspond to a respective precoder applied to the CLI-SRS 914 by the aggressor UE 904. In other words, each interference hypothesis may be associated with a TPMI/rank. Therefore, multiple CLI-SRSs corresponding to different interference hypotheses may be sequentially transmitted at 914 and measured at 916.

Figure 10:
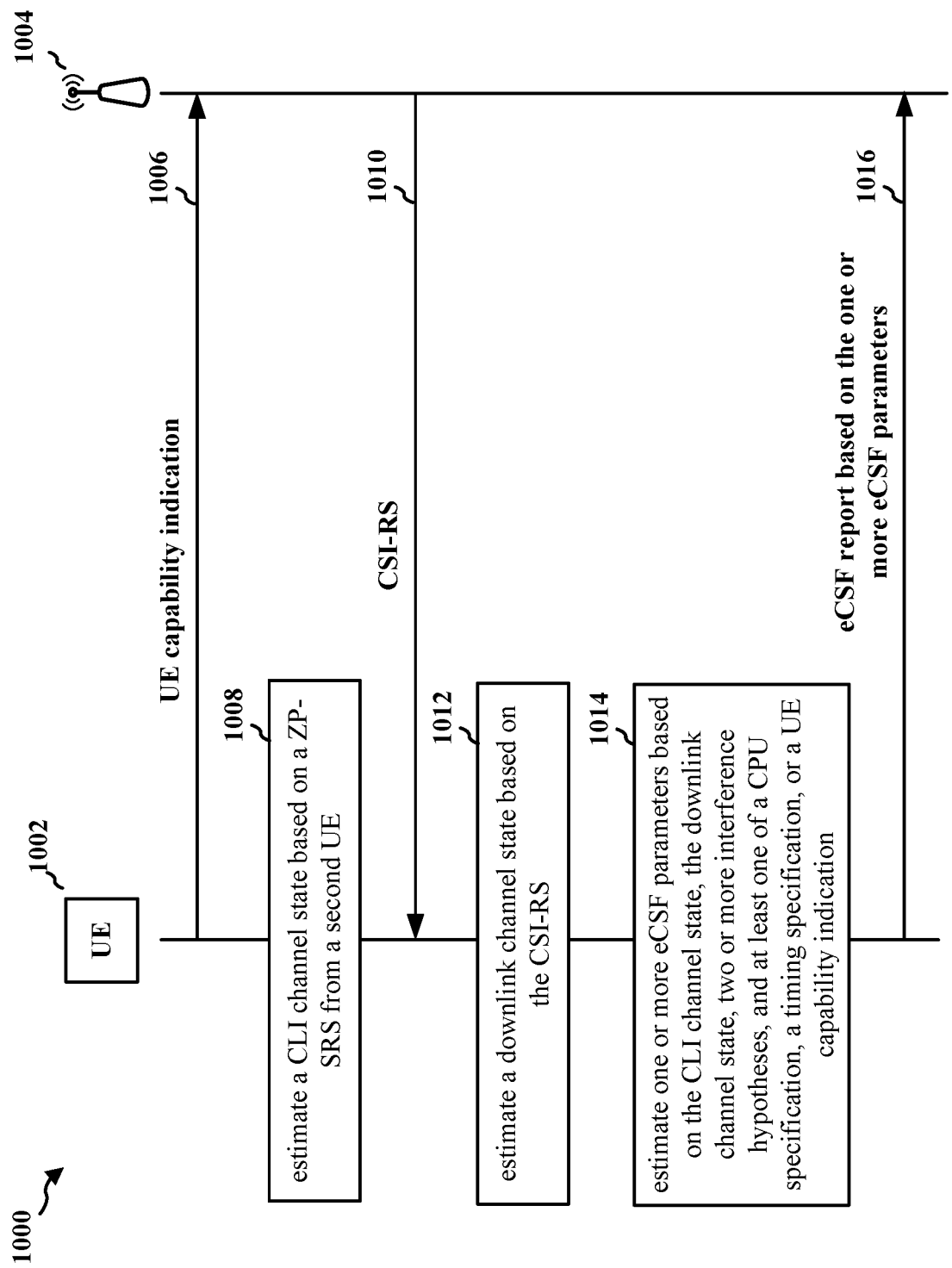
FIG. 10 is a flowchart illustrating an example process for providing an eCSF.

One or more aspects of the disclosure may relate to the CPU specifications, the timing specifications (Z/Z'), and/or the capability signaling from the UE related to the eCSF. FIG. 10 is a flowchart illustrating an example process 1000 for providing an eCSF. Computing spectral efficiency for more than one interference hypothesis (i.e., more than one TPMI) may lead to increased UE processing time for the CSI report. In some configurations, the UE may indicate to the network the CPU capability of the UE. A UE may be able to concurrently identify a limited number of CSIs based on the number of CPUs.

At 1006, the UE 1002 may transmit, to the network node 1004, and the network node 1004 may receive, from the UE 1002, a UE capability indication.

In one configuration, the UE capability indication may indicate a first UE capability associated with measuring one or more ZP-SRS resources.

In one configuration, the UE capability indication may include a standalone indication of the first UE capability associated with measuring the one or more ZP-SRS resources. For example, the standalone indication of the first UE capability associated with measuring the one or more ZP-SRS resources (e.g., UE features associated with measuring the one or more ZP-SRS resources) may include indications of one or more of a supported maximum number of configured ZP-SRS resources per CC, a supported maximum number of ports across all configured ZP-SRS resources per CC, a supported maximum number of simultaneous ZP-SRS resources in active BWPs across all CCs, a supported maximum number of simultaneous ZP-SRS resources per CC, a supported maximum total number of ZP-SRS ports in simultaneous ZP-SRS resources in active BWPs across all CCs, or a supported maximum total number of ZP-SRS ports in simultaneous ZP-SRS resources per CC.

In one configuration, the UE capability indication may include a combined indication of a second UE capability associated with measuring both the one or more ZP-SRS resources and one or more CSI-RS resources. For example, the combined indication of the second UE capability associated with measuring both the one or more ZP-SRS resources and one or more CSI-RS resources (e.g., UE features associated with measuring both the one or more ZP-SRS resources and one or more CSI-RS resources) may include indications of one or more of a supported maximum combined number of configured ZP-SRS resources and NZP-CSI-RS resources per CC, a supported maximum combined number of ports across all configured ZP-SRS resources and NZP-CSI-RS resources per CC, a supported maximum combined number of simultaneous ZP-SRS resources and NZP-CSI-RS resources in active BWPs across all CCs, a supported maximum combined number of simultaneous ZP-SRS resources and NZP-CSI-RS resources per CC, a supported maximum total combined number of ZP-SRS ports and NZP-CSI-RS ports in simultaneous ZP-SRS resources and NZP-CSI-RS resources in active BWPs across all CCs, or a supported maximum combined total number of ZP-SRS ports and NZP-CSI-RS ports in simultaneous ZP-SRS resources and NZP-CSI-RS resources per CC. Of course, the "maxConfigNumberCSI-IM-PerCC" feature may continue to be indicated.

At 1008, the UE 1002 may estimate a CLI channel state based on a ZP-SRS from a second UE (i.e., an aggressor UE).

At 1010, the network node 1004 may transmit, to the UE 1002, a CSI-RS.

At 1012, the UE 1002 may estimate a downlink channel state based on the CSI-RS 1010 from the network node 1004.

At 1014, the UE 1002 may estimate one or more eCSF parameters based on the CLI channel state, the downlink channel state, two or more interference hypotheses, and at least one of a CPU specification, a timing specification, or a UE capability indication.

In the CSF process illustrated in FIG. 7 where no CLI channel or interference hypothesis is taken into consideration and with the exception of beam reporting (i.e., reporting of L1-signal-to-interference-plus-noise ratio (SINR) (L1-SINR)/reference signal received power (RSRP)), the CPUs specified for a CSI report may be equal to the number of CSI-RS resources in the associated CSI-RS resource set. Further, if a single interference hypothesis is considered, then the eCSI report may be treated similar to the CSI report illustrated in FIG. 7 in terms of the CPU specification.

In one configuration where more than one interference hypothesis are considered, the number of CPUs specified may be proportional to a product (multiplication) of the number of CSI-RS resources and the number of interference hypotheses. In other words, the CPU specification may indicate a number of CPUs that is equal to a product of a number of CSI-RS resources and a number of the two or more interference hypotheses. For example, for an eCSI report that includes 2 CSI-RS resources and 3 interference hypotheses, 6 (=2*3) CPUs may be specified for computing the eCSF report.

In one configuration where more than one interference hypothesis are considered, the specified number of CPUs for the eCSF may be a function of both the number of CSI-RS resources and the number of interference hypotheses. However, the specified number of CPUs may be less than a product of the number of interference hypotheses and the number of CSI-RS resources (e.g., due to parallelization). In other words, the CPU specification may indicate a number of CPUs that is less than a product of a number of CSI-RS resources and a number of the two or more interference hypotheses. For example, for an eCSI report that includes 2 CSI-RS resources and 3 interference hypotheses, 4 (=2*ceil (3⁄2), ceil( ) being the ceiling function) CPUs may be specified for computing the eCSF report.

In one configuration where more than one interference hypothesis are considered, a predefined additional number of CPUs may be specified for the extra computation associated with the eCSF report. In other words, the CPU specification may indicate a number of CPUs that is a sum of a number of CSI-RS resources and a predefined number. For example, for an eCSI report that includes 2 CSI-RS resources and 3 interference hypotheses, 3 (=2+floor (3⁄2), floor( ) being the floor function) CPUs may be specified for computing the eCSF report (the predefined number may be 1 in this example).

In one configuration where more than one interference hypothesis are considered, the number of CPUs specified for eCSF computation may be increased (incremented) by 1 to account for the multi-port CLI channel measurement using the ZP-SRS compared to a scenario where the CLI channel is not considered or where a single interference hypothesis is considered. For example, 2 (=1 for the CSI-RS resource+1 for the ZP-SRS resource) CPUs may be specified for computing the eCSF report.

As to the timing specifications (Z/Z'), the latency class selected for the eCSI report may depend on the number of interference hypotheses associated with the report. In particular, a minimum delay of Z may be specified for the delay between a PDCCH scheduling/triggering the eCSF report and a PUSCH carrying the eCSF report (e.g., the eCSI report 922). Further, another minimum delay of Z' may be specified for the delay between a reference signal (e.g., a ZP-SRS or a CSI-RS) and the PUSCH carrying the eCSF report (e.g., the eCSI report 922). In one or more configurations, the timing specifications provided in Table 2 above may be reused for scenarios where the CLI channel is taken into consideration in the computation of the eCSF report. If a single interference hypothesis is considered, the same rules (e.g., the rules for selecting a latency class) as for a CSI report where no CLI channel or interference hypothesis is considered (such as the CSI report illustrated in FIG. 7) may be used.

In one configuration where more than one interference hypothesis are considered, the timing specification may correspond to a predefined high latency class timing specification (e.g., the Z2/Z2' specifications provided in Table 2 above).

In one configuration, the timing specification may correspond to a predefined new latency class timing specification (e.g., timing specifications Z4/Z4') not provided in Table 2 above. The new latency class timing specification (Z4/Z4') may be specific to the eCSF.

In one configuration, the predefined new latency class timing specification may be based at least in part on a number of the two or more interference hypotheses.

In one configuration, the predefined new latency class timing specification may be based at least in part on one or more of an SCS, a report quantity (i.e., "reportQuantity," which may specify the kind of quantity (e.g., SSB RSRP, CQI, PMI, RI, etc.) to be measured and reported), or a number of CSI-RS resources. The SCS, the report quantity, and the number of CSI-RS resources may be referred to as legacy factors.

In one configuration, a new timing specification table different from the Table 2 above may be defined for the timing specifications for configurations where more than one interference hypothesis are considered. In particular, the new timing specification table may depend on one or more of the legacy factors or the number of interference hypotheses.

In one configuration, each interference hypothesis in the two or more interference hypotheses may correspond to a TPMI.

At 1016, the UE 1002 may transmit, to the network node 1004, an eCSF report based on the one or more eCSF parameters.

Figure 11:
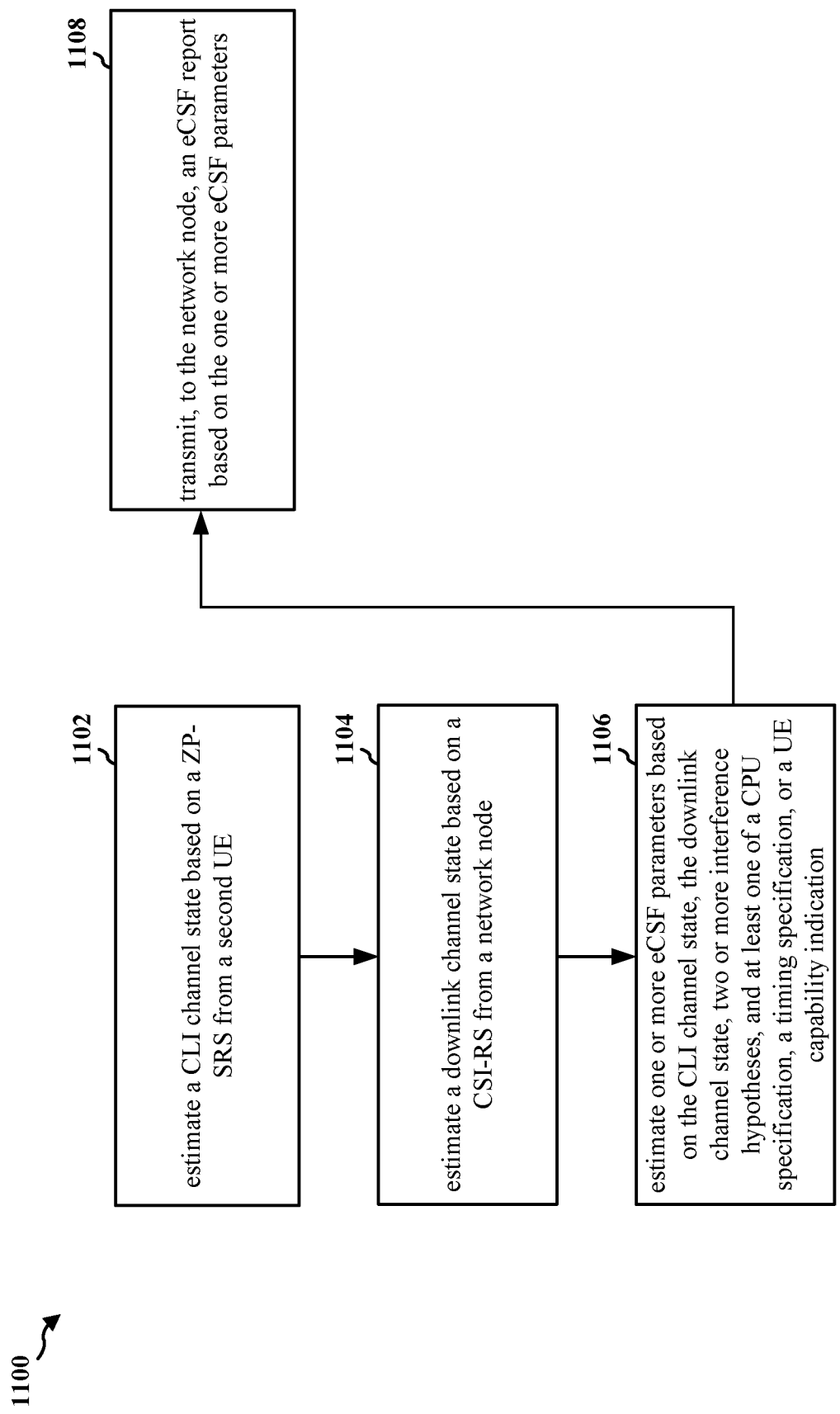
FIG. 11 is a flowchart of a method of wireless communication.

FIG. 11 is a flowchart 1100 of a method of wireless communication. The method may be performed by a UE (e.g., the UE 104/350/1002; the apparatus 1504). At 1102, the UE may estimate a CLI channel state based on a ZP-SRS from a second UE. For example, 1102 may be performed by the component 198 in FIG. 15. Referring to FIG. 10, at 1008, the UE 1002 may estimate a CLI channel state based on a ZP-SRS from a second UE.

At 1104, the UE may estimate a downlink channel state based on a CSI-RS from a network node. For example, 1104 may be performed by the component 198 in FIG. 15. Referring to FIG. 10, at 1012, the UE 1002 may estimate a downlink channel state based on a CSI-RS 1010 from a network node 1004.

At 1106, the UE may estimate one or more eCSF parameters based on the CLI channel state, the downlink channel state, two or more interference hypotheses, and at least one of a CPU specification, a timing specification, or a UE capability indication. For example, 1106 may be performed by the component 198 in FIG. 15. Referring to FIG. 10, at 1014, the UE 1002 may estimate one or more eCSF parameters based on the CLI channel state, the downlink channel state, two or more interference hypotheses, and at least one of a CPU specification, a timing specification, or a UE capability indication.

At 1108, the UE may transmit, to the network node, an eCSF report based on the one or more eCSF parameters. For example, 1108 may be performed by the component 198 in FIG. 15. Referring to FIG. 10, at 1016, the UE 1002 may transmit, to the network node 1004, an eCSF report based on the one or more eCSF parameters.

Figure 12:
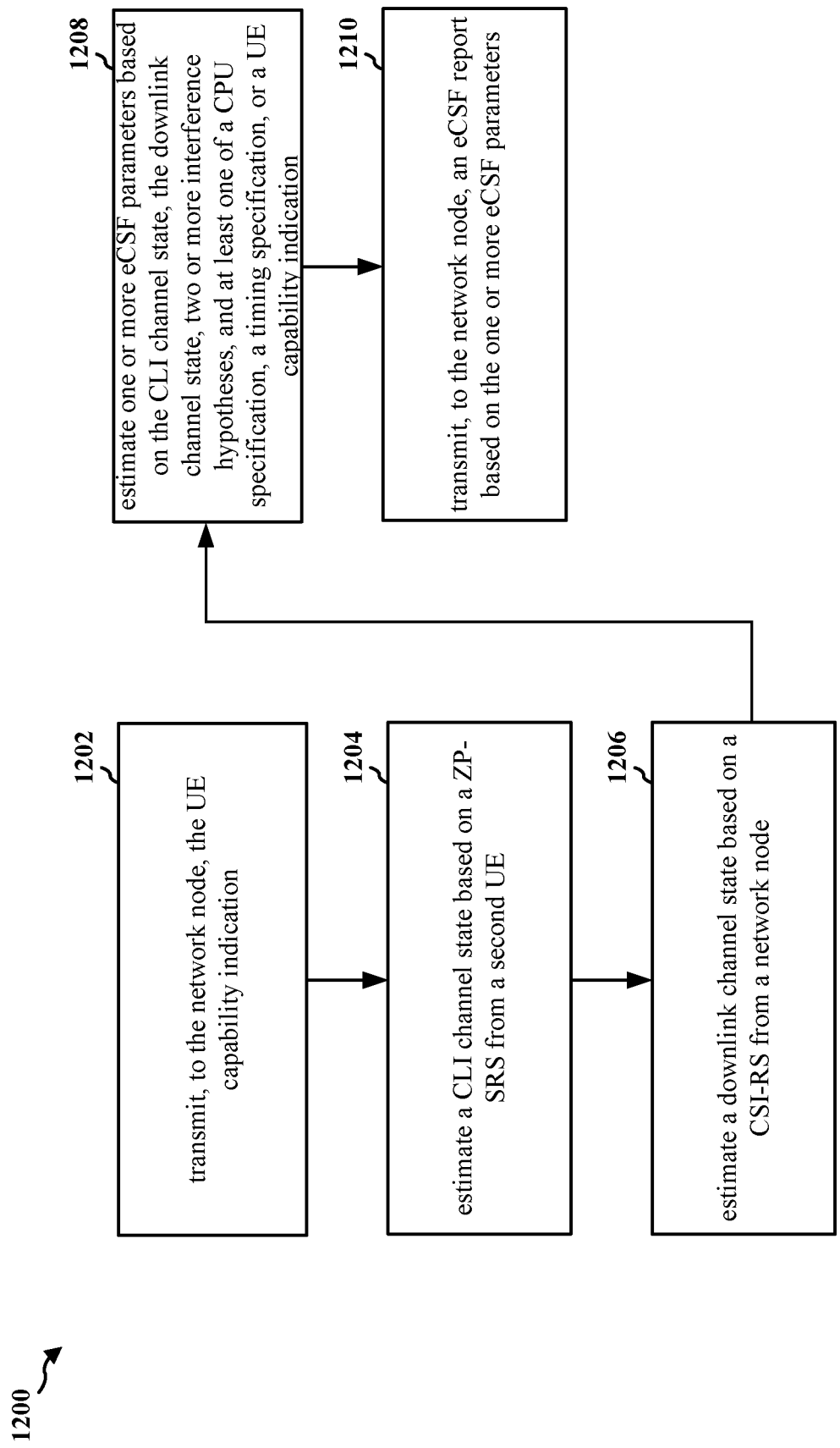
FIG. 12 is a flowchart of a method of wireless communication.

FIG. 12 is a flowchart 1200 of a method of wireless communication. The method may be performed by a UE (e.g., the UE 104/350/1002; the apparatus 1504). At 1204, the UE may estimate a CLI channel state based on a ZP-SRS from a second UE. For example, 1204 may be performed by the component 198 in FIG. 15. Referring to FIG. 10, at 1008, the UE 1002 may estimate a CLI channel state based on a ZP-SRS from a second UE.

At 1206, the UE may estimate a downlink channel state based on a CSI-RS from a network node. For example, 1206 may be performed by the component 198 in FIG. 15. Referring to FIG. 10, at 1012, the UE 1002 may estimate a downlink channel state based on a CSI-RS 1010 from a network node 1004.

At 1208, the UE may estimate one or more eCSF parameters based on the CLI channel state, the downlink channel state, two or more interference hypotheses, and at least one of a CPU specification, a timing specification, or a UE capability indication. For example, 1208 may be performed by the component 198 in FIG. 15. Referring to FIG. 10, at

1014, the UE 1002 may estimate one or more eCSF parameters based on the CLI channel state, the downlink channel state, two or more interference hypotheses, and at least one of a CPU specification, a timing specification, or a UE capability indication.

At 1210, the UE may transmit, to the network node, an eCSF report based on the one or more eCSF parameters. For example, 1210 may be performed by the component 198 in FIG. 15. Referring to FIG. 10, at 1016, the UE 1002 may transmit, to the network node 1004, an eCSF report based on the one or more eCSF parameters.

In one configuration, the CPU specification may indicate a number of CPUs that is equal to a product of a number of CSI-RS resources and a number of the two or more interference hypotheses.

In one configuration, the CPU specification may indicate a number of CPUs that is less than a product of a number of CSI-RS resources and a number of the two or more interference hypotheses.

In one configuration, the CPU specification may indicate a number of CPUs that is a sum of a number of CSI-RS resources and a predefined number.

In one configuration, the predefined number may be 1.

In one configuration, the timing specification may correspond to a predefined high latency class timing specification.

In one configuration, the timing specification may correspond to a predefined new latency class timing specification.

In one configuration, the predefined new latency class timing specification may be based at least in part on a number of the two or more interference hypotheses.

In one configuration, the predefined new latency class timing specification may be based at least in part on one or more of an SCS, a report quantity, or a number of CSI-RS resources.

In one configuration, at 1202, the UE may transmit, to the network node, the UE capability indication. For example, 1202 may be performed by the component 198 in FIG. 15. Referring to FIG. 10, at 1006, the UE 1002 may transmit, to the network node 1004, the UE capability indication.

In one configuration, the UE capability indication may indicate a first UE capability associated with measuring one or more ZP-SRS resources.

In one configuration, the UE capability indication may include a standalone indication of the first UE capability associated with measuring the one or more ZP-SRS resources.

In one configuration, the UE capability indication may include a combined indication of a second UE capability associated with measuring both the one or more ZP-SRS resources and one or more CSI-RS resources.

In one configuration, each interference hypothesis in the two or more interference hypotheses may correspond to a TPMI.

Figure 13:
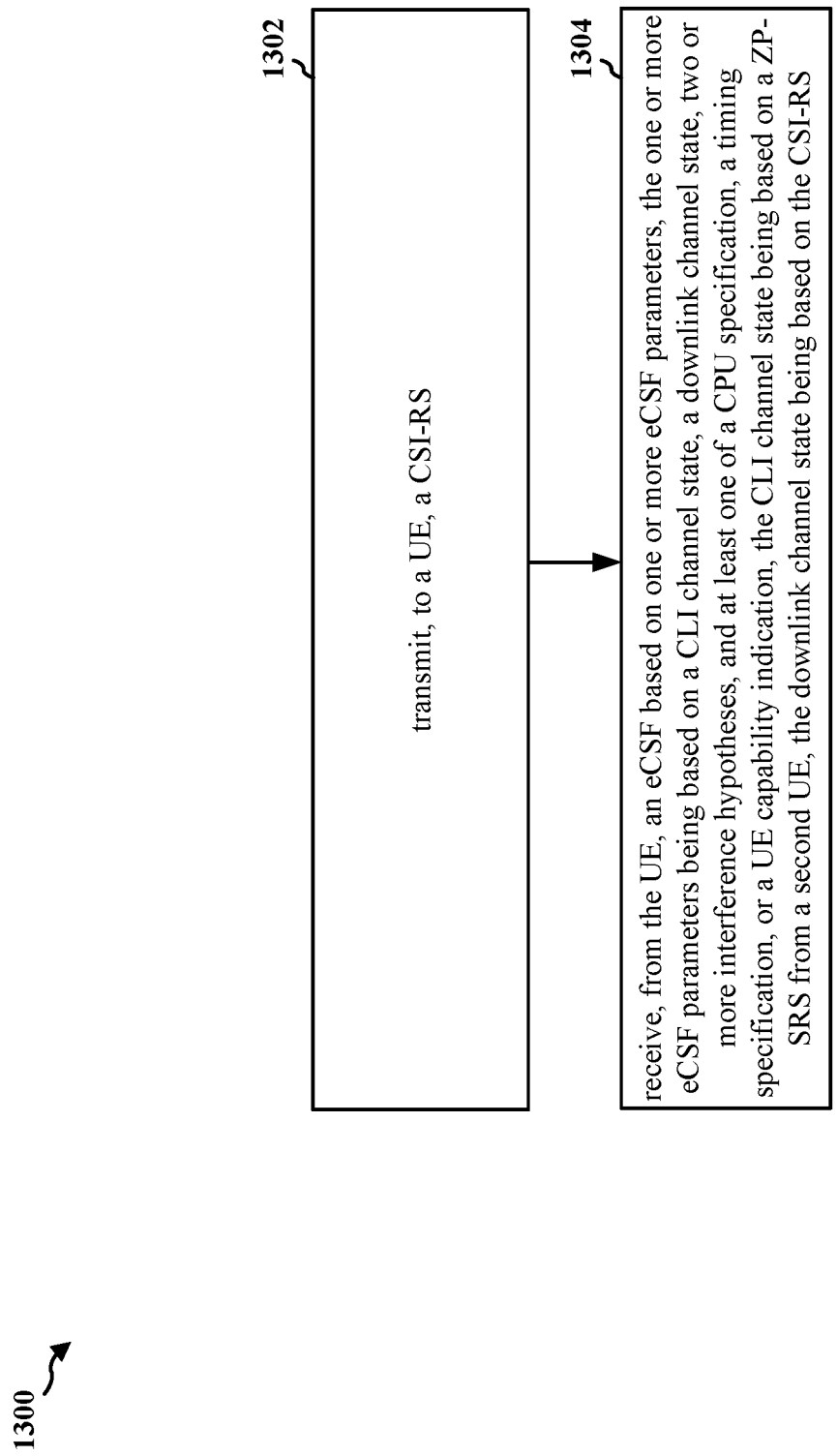
FIG. 13 is a flowchart of a method of wireless communication.

FIG. 13 is a flowchart 1300 of a method of wireless communication. The method may be performed by a network node (e.g., the base station 102/310; the network node 1004; the network entity 1502). At 1302, the network node may transmit, to a UE, a CSI-RS. For example, 1302 may be performed by the component 199 in FIG. 16. Referring to FIG. 10, at 1010, the network node 1004 may transmit, to a UE 1002, a CSI-RS.

At 1304, the network node may receive, from the UE, an eCSF based on one or more eCSF parameters. The one or more eCSF parameters may be based on a CLI channel state, a downlink channel state, two or more interference hypotheses, and at least one of a CPU specification, a timing specification, or a UE capability indication. The CLI channel state may be based on a ZP-SRS from a second UE. The downlink channel state may be based on the CSI-RS. For example, 1304 may be performed by the component 199 in FIG. 16. Referring to FIG. 10, at 1016, the network node 1004 receive, from the UE 1002, an eCSF based on one or more eCSF parameters.

Figure 14:
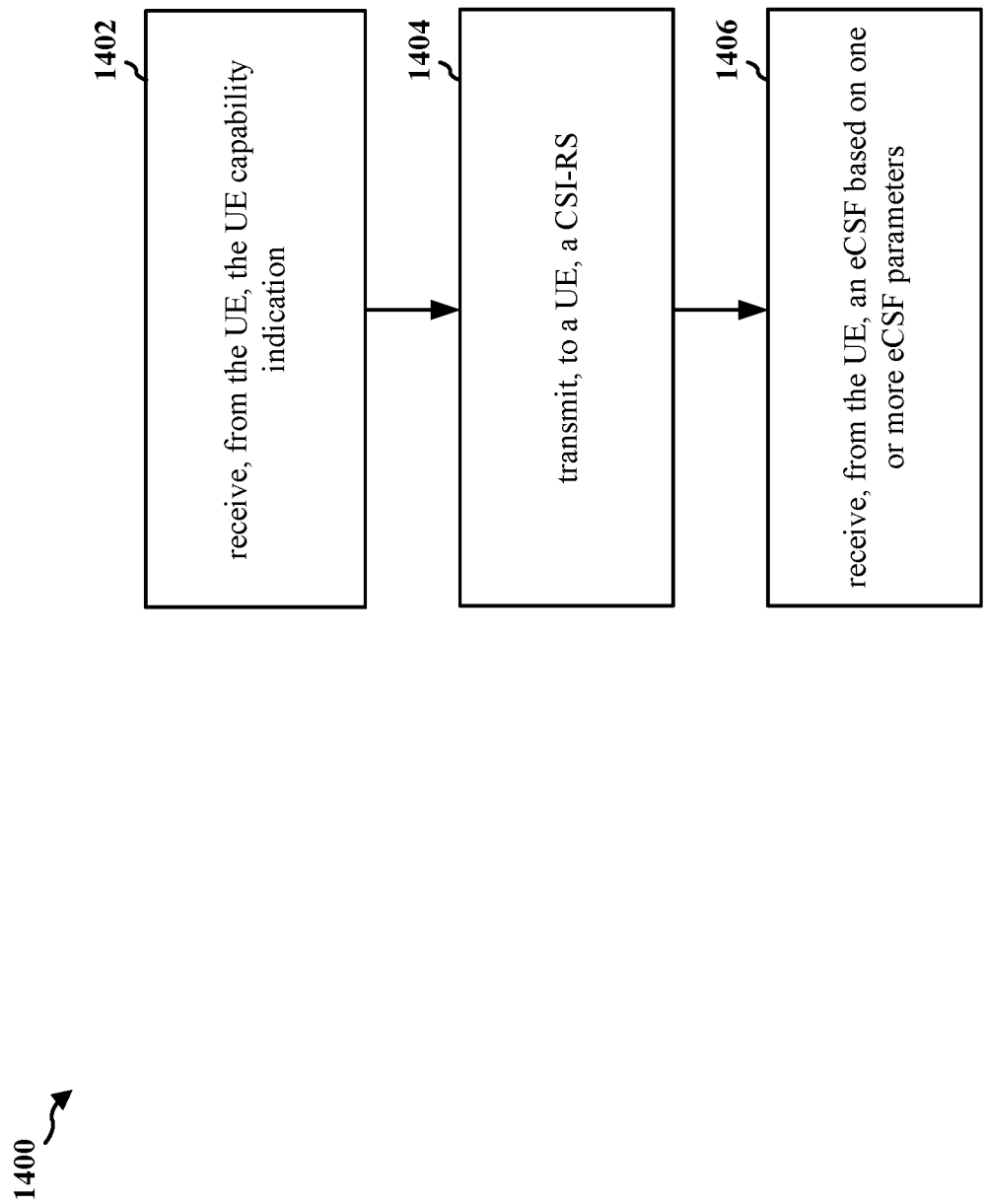
FIG. 14 is a flowchart of a method of wireless communication.

FIG. 14 is a flowchart 1400 of a method of wireless communication. The method may be performed by a network node (e.g., the base station 102/310; the network node 1004; the network entity 1502). At 1404, the network node may transmit, to a UE, a CSI-RS. For example, 1404 may be performed by the component 199 in FIG. 16. Referring to FIG. 10, at 1010, the network node 1004 may transmit, to a UE 1002, a CSI-RS.

At 1406, the network node may receive, from the UE, an eCSF based on one or more eCSF parameters. The one or more eCSF parameters may be based on a CLI channel state, a downlink channel state, two or more interference hypotheses, and at least one of a CPU specification, a timing specification, or a UE capability indication. The CLI channel state may be based on a ZP-SRS from a second UE. The downlink channel state may be based on the CSI-RS. For example, 1406 may be performed by the component 199 in FIG. 16. Referring to FIG. 10, at 1016, the network node 1004 receive, from the UE 1002, an eCSF based on one or more eCSF parameters.

In one configuration, the CPU specification may indicate a number of CPUs that is equal to a product of a number of CSI-RS resources and a number of the two or more interference hypotheses.

In one configuration, the CPU specification may indicate a number of CPUs that is less than a product of a number of CSI-RS resources and a number of the two or more interference hypotheses.

In one configuration, the CPU specification may indicate a number of CPUs that is a sum of a number of CSI-RS resources and a predefined number.

In one configuration, the predefined number may be 1.

In one configuration, the timing specification may correspond to a predefined high latency class timing specification.

In one configuration, the timing specification may correspond to a predefined new latency class timing specification.

In one configuration, the predefined new latency class timing specification may be based at least in part on a number of the two or more interference hypotheses.

In one configuration, the predefined new latency class timing specification may be based at least in part on one or more of an SCS, a report quantity, or a number of CSI-RS resources.

In one configuration, at 1402, the network node may receive, from the UE, the UE capability indication. For example, 1402 may be performed by the component 199 in FIG. 16. Referring to FIG. 10, at 1006, the network node 1004 may receive, from the UE 1002, the UE capability indication.

In one configuration, the UE capability indication may indicate a first UE capability associated with measuring one or more ZP-SRS resources.

In one configuration, the UE capability indication may include a standalone indication of the first UE capability associated with measuring the one or more ZP-SRS resources.

In one configuration, the UE capability indication may include a combined indication of a second UE capability associated with measuring both the one or more ZP-SRS resources and one or more CSI-RS resources.

In one configuration, each interference hypothesis in the two or more interference hypotheses may correspond to a TPMI.

Figure 15:
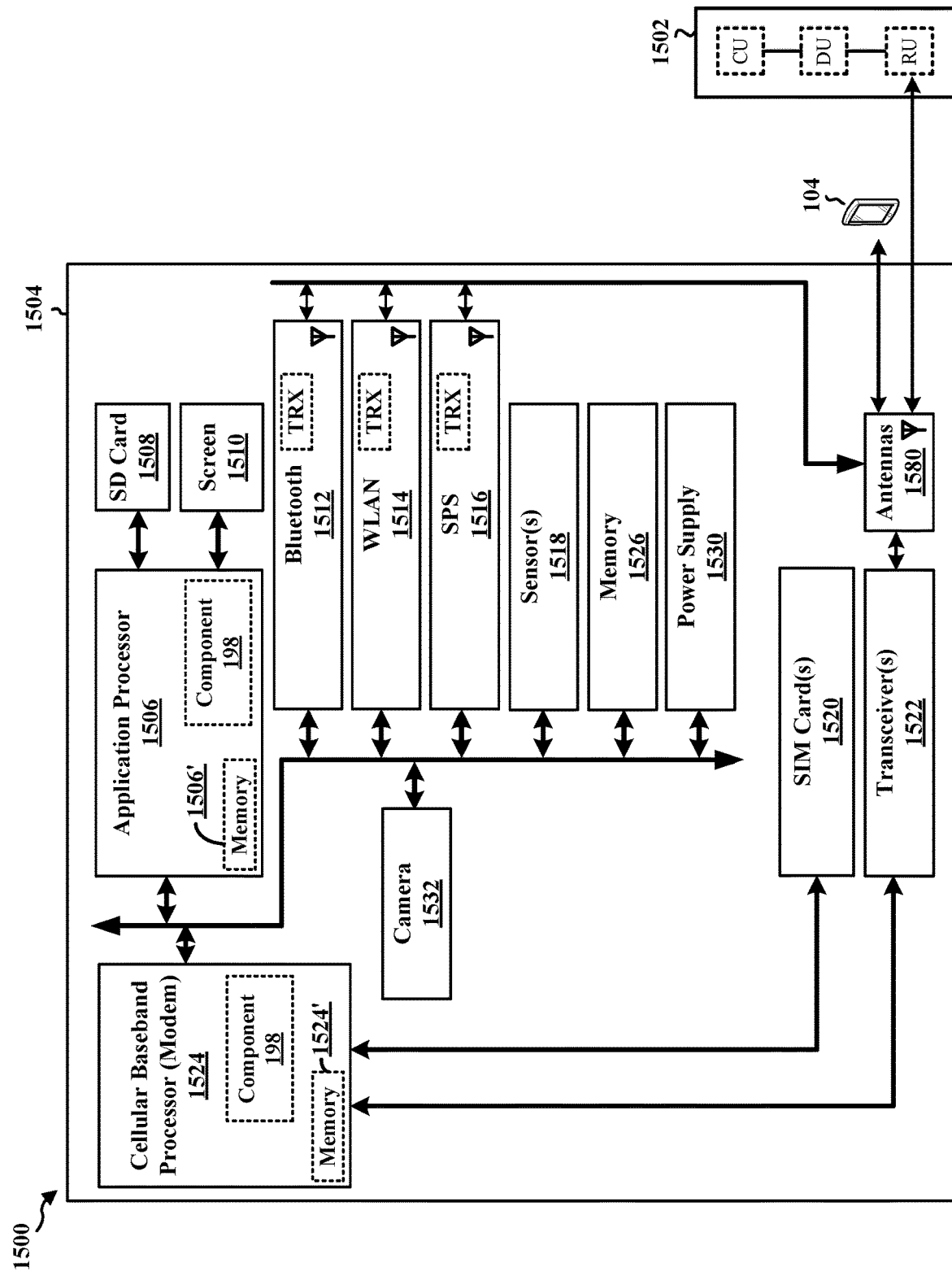
FIG. 15 is a diagram illustrating an example of a hardware implementation for an example apparatus and/or network entity.

FIG. 15 is a diagram 1500 illustrating an example of a hardware implementation for an apparatus 1504. The apparatus 1504 may be a UE, a component of a UE, or may implement UE functionality. In some aspects, the apparatus 1504 may include a cellular baseband processor 1524 (also referred to as a modem) coupled to one or more transceivers 1522 (e.g., cellular RF transceiver). The cellular baseband processor 1524 may include on-chip memory 1524'. In some aspects, the apparatus 1504 may further include one or more subscriber identity modules (SIM) cards 1520 and an application processor 1506 coupled to a secure digital (SD) card 1508 and a screen 1510. The application processor 1506 may include on-chip memory 1506'. In some aspects, the apparatus 1504 may further include a Bluetooth module 1512, a WLAN module 1514, an SPS module 1516 (e.g., GNSS module), one or more sensor modules 1518 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the WLAN module 1514, and the SPS module 1516 may include an on-chip transceiver (TRX) (or in some cases, just a receiver (RX)). The Bluetooth module 1512, the WLAN module 1514, and the SPS module 1516 may include their own dedicated antennas and/or utilize the antennas 1580 for communication. The cellular baseband processor 1524 communicates through the transceiver(s) 1522 via one or more antennas 1580 with the UE 104 and/or with an RU associated with a network entity 1502. The cellular baseband processor 1524 and the application processor 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor 1524 and the application processor 1506 are each responsible for general processing, including the execution of software stored on the computer-readable medium/memory. The software, when executed by the cellular baseband processor 1524/application processor 1506, causes the cellular baseband processor 1524/application processor 1506 to perform the various functions described supra. The computer-readable medium/memory may also be used for storing data that is manipulated by the cellular baseband processor 1524/application processor 1506 when executing software. The cellular baseband processor 1524/application processor 1506 may be a component of the UE 350 and may include the memory 360 and/or at least one of the TX processor 368, the RX processor 356, and the controller/processor 359. In one configuration, the apparatus 1504 may be a processor chip (modem and/or application) and include just the cellular baseband processor 1524 and/or the application processor 1506, and in another configuration, the apparatus 1504 may be the entire UE (e.g., see 350 of FIG. 3) and include the additional modules of the apparatus 1504.

As discussed supra, the component 198 is configured to estimate a CLI channel state based on a ZP-SRS from a second UE. The component 198 may be configured to estimate a downlink channel state based on a CSI-RS from a network node. The component 198 may be configured to estimate one or more eCSF parameters based on the CLI channel state, the downlink channel state, two or more interference hypotheses, and at least one of a CPU specification, a timing specification, or a UE capability indication. The component 198 may be configured to transmit, to the network node, an eCSF report based on the one or more eCSF parameters. The component 198 may be within the cellular baseband processor 1524, the application processor 1506, or both the cellular baseband processor 1524 and the application processor 1506. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1504 may include a variety of components configured for various functions. In one configuration, the apparatus 1504, and in particular the cellular baseband processor 1524 and/or the application processor 1506, includes means for estimating a CLI channel state based on a ZP-SRS from a second UE. The apparatus 1504, and in particular the cellular baseband processor 1524 and/or the application processor 1506, includes means for estimating a downlink channel state based on a CSI-RS from a network node. The apparatus 1504, and in particular the cellular baseband processor 1524 and/or the application processor 1506, includes means for estimating one or more eCSF parameters based on the CLI channel state, the downlink channel state, two or more interference hypotheses, and at least one of a CPU specification, a timing specification, or a UE capability indication. The apparatus 1504, and in particular the cellular baseband processor 1524 and/or the application processor 1506, includes means for transmitting, to the network node, an eCSF report based on the one or more eCSF parameters.

In one configuration, the CPU specification may indicate a number of CPUs that is equal to a product of a number of CSI-RS resources and a number of the two or more interference hypotheses. In one configuration, the CPU specification may indicate a number of CPUs that is less than a product of a number of CSI-RS resources and a number of the two or more interference hypotheses. In one configuration, the CPU specification may indicate a number of CPUs that is a sum of a number of CSI-RS resources and a predefined number. In one configuration, the predefined number may be 1. In one configuration, the timing specification may correspond to a predefined high latency class timing specification. In one configuration, the timing specification may correspond to a predefined new latency class timing specification. In one configuration, the predefined new latency class timing specification may be based at least in part on a number of the two or more interference hypotheses. In one configuration, the predefined new latency class timing specification may be based at least in part on one or more of an SCS, a report quantity, or a number of CSI-RS resources. In one configuration, the apparatus 1504, and in particular the cellular baseband processor 1524 and/or the application processor 1506, includes means for transmitting, to the network node, the UE capability indication. In one configuration, the UE capability indication may indicate a first UE capability associated with measuring one or more ZP-SRS resources. In one configuration, the UE capability indication may include a standalone indication of the first UE capability associated with measuring the one or more ZP-SRS resources. In one configuration, the UE capability indication may include a combined indication of a second UE capability associated with measuring both the one or more ZP-SRS resources and one or more CSI-RS resources. In one configuration, each interference hypothesis in the two or more interference hypotheses may correspond to a TPMI.

The means may be the component 198 of the apparatus 1504 configured to perform the functions recited by the means. As described supra, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means.

Figure 16:
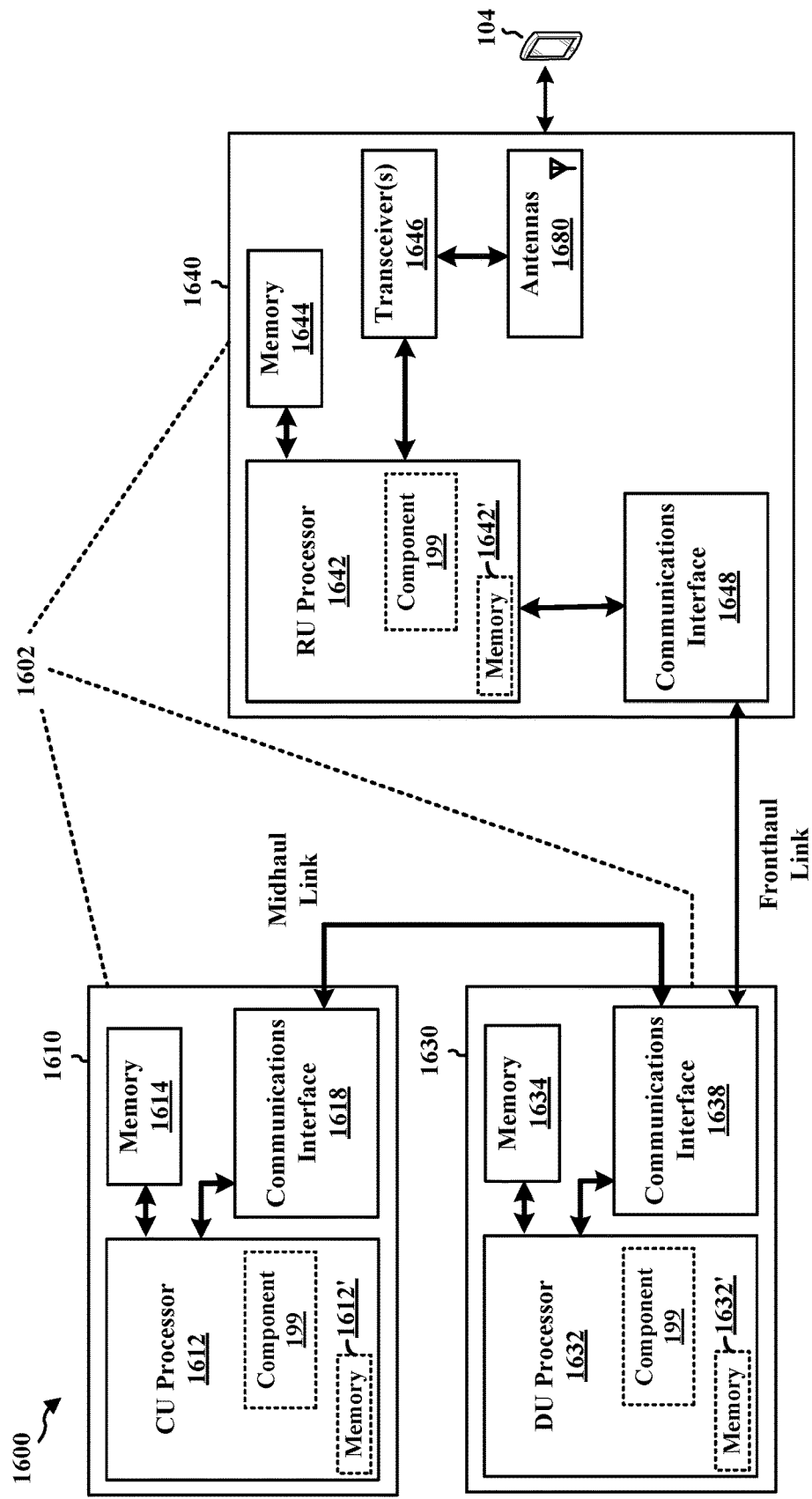
FIG. 16 is a diagram illustrating an example of a hardware implementation for an example network entity.

FIG. 16 is a diagram 1600 illustrating an example of a hardware implementation for a network entity 1602. The network entity 1602 may be a BS, a component of a BS, or may implement BS functionality. The network entity 1602 may include at least one of a CU 1610, a DU 1630, or an RU 1640. For example, depending on the layer functionality handled by the component 199, the network entity 1602 may include the CU 1610; both the CU 1610 and the DU 1630; each of the CU 1610, the DU 1630, and the RU 1640; the DU 1630; both the DU 1630 and the RU 1640; or the RU 1640. The CU 1610 may include a CU processor 1612. The CU processor 1612 may include on-chip memory 1612'. In some aspects, the CU 1610 may further include additional memory modules 1614 and a communications interface 1618. The CU 1610 communicates with the DU 1630 through a midhaul link, such as an F1 interface. The DU 1630 may include a DU processor 1632. The DU processor 1632 may include on-chip memory 1632'. In some aspects, the DU 1630 may further include additional memory modules 1634 and a communications interface 1638. The DU 1630 communicates with the RU 1640 through a fronthaul link. The RU 1640 may include an RU processor 1642. The RU processor 1642 may include on-chip memory 1642'. In some aspects, the RU 1640 may further include additional memory modules 1644, one or more transceivers 1646, antennas 1680, and a communications interface 1648. The RU 1640 communicates with the UE 104. The on-chip memory 1612', 1632', 1642' and the additional memory modules 1614, 1634, 1644 may each be considered a computer-readable medium/memory. Each computer-readable medium/memory may be non-transitory. Each of the processors 1612, 1632, 1642 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to transmit, to a UE, a CSI-RS. The component 199 may be configured to receive, from the UE, an eCSF based on one or more eCSF parameters. The one or more eCSF parameters may be based on a CLI channel state, a downlink channel state, two or more interference hypotheses, and at least one of a CPU specification, a timing specification, or a UE capability indication. The CLI channel state may be based on a ZP-SRS from a second UE. The downlink channel state may be based on the CSI-RS. The component 199 may be within one or more processors of one or more of the CU 1610, DU 1630, and the RU 1640. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1602 may include a variety of components configured for various functions. In one configuration, the network entity 1602 includes means for transmitting, to a UE, a CSI-RS. The network entity 1602 includes means for receiving, from the UE, an eCSF based on one or more eCSF parameters. The one or more eCSF parameters may be based on a CLI channel state, a downlink channel state, two or more interference hypotheses, and at least one of a CPU specification, a timing specification, or a UE capability indication. The CLI channel state may be based on a ZP-SRS from a second UE. The downlink channel state may be based on the CSI-RS.

In one configuration, the CPU specification may indicate a number of CPUs that is equal to a product of a number of CSI-RS resources and a number of the two or more interference hypotheses. In one configuration, the CPU specification may indicate a number of CPUs that is less than a product of a number of CSI-RS resources and a number of the two or more interference hypotheses. In one configuration, the CPU specification may indicate a number of CPUs that is a sum of a number of CSI-RS resources and a predefined number. In one configuration, the predefined number may be 1. In one configuration, the timing specification may correspond to a predefined high latency class timing specification. In one configuration, the timing specification may correspond to a predefined new latency class timing specification. In one configuration, the predefined new latency class timing specification may be based at least in part on a number of the two or more interference hypotheses. In one configuration, the predefined new latency class timing specification may be based at least in part on one or more of an SCS, a report quantity, or a number of CSI-RS resources. In one configuration, the network entity 1602 includes means for receiving, from the UE, the UE capability indication. In one configuration, the UE capability indication may indicate a first UE capability associated with measuring one or more ZP-SRS resources. In one configuration, the UE capability indication may include a stand-alone indication of the first UE capability associated with measuring the one or more ZP-SRS resources. In one configuration, the UE capability indication may include a combined indication of a second UE capability associated with measuring both the one or more ZP-SRS resources and one or more CSI-RS resources. In one configuration, each interference hypothesis in the two or more interference hypotheses may correspond to a TPMI.

The means may be the component 199 of the network entity 1602 configured to perform the functions recited by the means. As described supra, the network entity 1602 may include the TX processor 316, the RX processor 370, and the controller/processor 375. As such, in one configuration, the means may be the TX processor 316, the RX processor 370, and/or the controller/processor 375 configured to perform the functions recited by the means.

Referring back to FIGS. 4-14, a UE may estimate a CLI channel state based on a ZP-SRS from a second UE. A network node may transmit to the UE, and the UE may receive from the network node, a CSI-RS. The UE may estimate a downlink channel state based on the CSI-RS from the network node. The UE may estimate one or more eCSF parameters based on the CLI channel state, the downlink channel state, two or more interference hypotheses, and at least one of a CPU specification, a timing specification, or a UE capability indication. The UE may transmit to the network node, and the network node may receive from the UE, an eCSF report based on the one or more eCSF parameters. Accordingly, the eCSF may be enabled where the impact of the TPMI chosen by the aggressor UE is taken into consideration in the computation of the eCSF report.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including estimating a CLI channel state based on a ZP-SRS from a second UE; estimating a downlink channel state based on a CSI-RS from a network node; estimating one or more eCSF parameters based on the CLI channel state, the downlink channel state, two or more interference hypotheses, and at least one of a CPU specification, a timing specification, or a UE capability indication; and transmitting, to the network node, an eCSF report based on the one or more eCSF parameters.

Aspect 2 is the method of aspect 1, where the CPU specification indicates a number of CPUs that is equal to a product of a number of CSI-RS resources and a number of the two or more interference hypotheses.

Aspect 3 is the method of aspect 1, where the CPU specification indicates a number of CPUs that is less than a product of a number of CSI-RS resources and a number of the two or more interference hypotheses.

Aspect 4 is the method of aspect 1, where the CPU specification indicates a number of CPUs that is a sum of a number of CSI-RS resources and a predefined number.

Aspect 5 is the method of aspect 4, where the predefined number is 1.

Aspect 6 is the method of any of aspects 1 to 5, where the timing specification corresponds to a predefined high latency class timing specification.

Aspect 7 is the method of any of aspects 1 to 5, where the timing specification corresponds to a predefined new latency class timing specification.

Aspect 8 is the method of aspect 7, where the predefined new latency class timing specification is based at least in part on a number of the two or more interference hypotheses.

Aspect 9 is the method of any of aspects 7 and 8, where the predefined new latency class timing specification is based at least in part on one or more of an SCS, a report quantity, or a number of CSI-RS resources.

Aspect 10 is the method of any of aspects 1 to 9, further including: transmitting, to the network node, the UE capability indication.

Aspect 11 is the method of any of aspects 1 to 10, where the UE capability indication indicates a first UE capability associated with measuring one or more ZP-SRS resources.

Aspect 12 is the method of aspect 11, where the UE capability indication includes a standalone indication of the first UE capability associated with measuring the one or more ZP-SRS resources.

Aspect 13 is the method of aspect 11, where the UE capability indication includes a combined indication of a second UE capability associated with measuring both the one or more ZP-SRS resources and one or more CSI-RS resources.

Aspect 14 is the method of any of aspects 1 to 13, where each interference hypothesis in the two or more interference hypotheses corresponds to a TPMI.

Aspect 15 is a method of wireless communication at a network node, including transmitting, to a UE, a CSI- RS; receiving, from the UE, an eCSF based on one or more eCSF parameters, the one or more eCSF parameters being based on a CLI channel state, a downlink channel state, two or more interference hypotheses, and at least one of a CPU specification, a timing specification, or a UE capability indication, the CLI channel state being based on a ZP-SRS from a second UE, the downlink channel state being based on the CSI-RS.

Aspect 16 is the method of aspect 15, where the CPU specification indicates a number of CPUs that is equal to a product of a number of CSI-RS resources and a number of the two or more interference hypotheses.

Aspect 17 is the method of aspect 15, where the CPU specification indicates a number of CPUs that is less than a product of a number of CSI-RS resources and a number of the two or more interference hypotheses.

Aspect 18 is the method of aspect 15, where the CPU specification indicates a number of CPUs that is a sum of a number of CSI-RS resources and a predefined number.

Aspect 19 is the method of aspect 18, where the predefined number is 1.

Aspect 20 is the method of any of aspects 15 to 19, where the timing specification corresponds to a predefined high latency class timing specification.

Aspect 21 is the method of any of aspects 15 to 19, where the timing specification corresponds to a predefined new latency class timing specification.

Aspect 22 is the method of aspect 21, where the predefined new latency class timing specification is based at least in part on a number of the two or more interference hypotheses.

Aspect 23 is the method of any of aspects 21 and 22, where the predefined new latency class timing specification is based at least in part on one or more of an SCS, a report quantity, or a number of CSI-RS resources.

Aspect 24 is the method of any of aspects 15 to 23, further including: receiving, from the UE, the UE capability indication.

Aspect 25 is the method of any of aspects 15 to 24, where the UE capability indication indicates a first UE capability associated with measuring one or more ZP-SRS resources.

Aspect 26 is the method of aspect 25, where the UE capability indication includes a standalone indication of the first UE capability associated with measuring the one or more ZP-SRS resources.

Aspect 27 is the method of aspect 25, where the UE capability indication includes a combined indication of a second UE capability associated with measuring both the one or more ZP-SRS resources and one or more CSI-RS resources.

Aspect 28 is the method of any of aspects 15 to 27, where each interference hypothesis in the two or more interference hypotheses corresponds to a TPMI.

What is claimed is:

1. An apparatus for wireless communication at a user equipment (UE), comprising:
   memory; and
   at least one processor coupled to the memory and, based at least in part on information stored in the memory, the at least one processor is configured to:
   compute a cross-link interference (CLI) channel state based on a zero power (ZP) —sounding reference signal (SRS) (ZP-SRS) from a second UE;
   compute a downlink channel state based on a channel state information (CSI)-reference signal (RS) (CSI-RS) from a network node;
   compute, using at least one CSI processing unit (CPU) specified by a CPU specification, one or more enhanced channel state feedback (eCSF) parameters based on the CLI channel state, the downlink channel state, two or more interference hypotheses, and at least one of the CPU specification, a timing specification, or a UE capability indication, wherein the CPU specification indicates a number of CPUs that is based on a product of a number of CSI-RS resources and a number of the two or more interference hypotheses or based on a sum of the number of CSI-RS resources and a predefined number; and
   transmit, to the network node, an eCSF report based on the one or more eCSF parameters.

2. The apparatus of claim 1, wherein the CPU specification indicates the number of CPUs that is equal to the product of the number of CSI-RS resources and the number of the two or more interference hypotheses.

3. The apparatus of claim 1, wherein the CPU specification indicates the number of CPUs that is less than the product of the number of CSI-RS resources and the number of the two or more interference hypotheses.

4. The apparatus of claim 1, wherein the CPU specification indicates the number of CPUs that is the sum of the number of CSI-RS resources and the predefined number.

5. The apparatus of claim 4, wherein the predefined number is 1.

6. The apparatus of claim 1, wherein the timing specification corresponds to a predefined high latency class timing specification.

7. The apparatus of claim 1, wherein the timing specification corresponds to a predefined new latency class timing specification.

8. The apparatus of claim 7, wherein the predefined new latency class timing specification is based at least in part on a number of the two or more interference hypotheses.

9. The apparatus of claim 7, wherein the predefined new latency class timing specification is based at least in part on one or more of a subcarrier spacing (SCS), a report quantity, or the number of CSI-RS resources.

10. The apparatus of claim 1, the at least one processor being configured to:
    transmit, to the network node, the UE capability indication.

11. The apparatus of claim 1, wherein the UE capability indication indicates a first UE capability associated with measuring one or more ZP-SRS resources.

12. The apparatus of claim 11, wherein the UE capability indication includes a standalone indication of the first UE capability associated with measuring the one or more ZP-SRS resources.

13. The apparatus of claim 11, wherein the UE capability indication includes a combined indication of a second UE capability associated with measuring both the one or more ZP-SRS resources and one or more CSI-RS resources.

14. The apparatus of claim 1, further comprising a transceiver coupled to the at least one processor, wherein each interference hypothesis in the two or more interference hypotheses corresponds to a transmitted precoding matrix indicator (TPMI).

15. A method of wireless communication at a user equipment (UE), comprising:

computing a cross-link interference (CLI) channel state based on a zero power (ZP)-sounding reference signal (SRS) (ZP-SRS) from a second UE;

computing a downlink channel state based on a channel state information (CSI)-reference signal (RS) (CSI-RS) from a network node;

computing, using at least one CSI processing unit (CPU) specified by a CPU specification, one or more enhanced channel state feedback (eCSF) parameters based on the CLI channel state, the downlink channel state, two or more interference hypotheses, and at least one of the CPU specification, a timing specification, or a UE capability indication, wherein the CPU specification indicates a number of CPUs that is based on a product of a number of CSI-RS resources and a number of the two or more interference hypotheses or based on a sum of the number of CSI-RS resources and a predefined number; and transmitting, to the network node, an eCSF report based on the one or more eCSF parameters.

16. An apparatus for wireless communication at a network node, comprising:

memory; and at least one processor coupled to the memory and, based at least in part on information stored in the memory, the at least one processor is configured to:

transmit, to a user equipment (UE), a channel state information (CSI)—reference signal (RS) (CSI-RS);

receive, from the UE, an enhanced channel state feedback (eCSF) based on one or more eCSF parameters, the one or more eCSF parameters being based on a cross-link interference (CLI) channel state, a downlink channel state, two or more interference hypotheses, a CSI processing unit (CPU) specification, and at least one of a timing specification, or a UE capability indication, the CLI channel state being based on a zero power (ZP)—sounding reference signal (SRS) (ZP-SRS) from a second UE, the downlink channel state being based on the CSI-RS, wherein the CPU specification indicates a number of CPUs that is based on a product of a number of CSI-RS resources and a number of the two or more interference hypotheses or based on a sum of the number of CSI-RS resources and a predefined number; and transmit, to the UE, a physical downlink shared channel (PDSCH) transmission based on the eCSF.

17. The apparatus of claim 16, wherein the CPU specification indicates the number of CPUs that is equal to the product of the number of CSI-RS resources and the number of the two or more interference hypotheses.

18. The apparatus of claim 16, wherein the CPU specification indicates the number of CPUs that is less than the product of the number of CSI-RS resources and the number of the two or more interference hypotheses.

19. The apparatus of claim 16, wherein the CPU specification indicates the number of CPUs that is the sum of the number of CSI-RS resources and the predefined number.

20. The apparatus of claim 19, wherein the predefined number is 1.

21. The apparatus of claim 16, wherein the timing specification corresponds to a predefined high latency class timing specification.

22. The apparatus of claim 16, wherein the timing specification corresponds to a predefined new latency class timing specification.

23. The apparatus of claim 22, wherein the predefined new latency class timing specification is based at least in part on a number of the two or more interference hypotheses.

24. The apparatus of claim 22, wherein the predefined new latency class timing specification is based at least in part on one or more of a subcarrier spacing (SCS), a report quantity, or the number of CSI-RS resources.

25. The apparatus of claim 16, the at least one processor being configured to:

receive, from the UE, the UE capability indication.

26. The apparatus of claim 16, wherein the UE capability indication indicates a first UE capability associated with measuring one or more ZP-SRS resources.

27. The apparatus of claim 26, wherein the UE capability indication includes a standalone indication of the first UE capability associated with measuring the one or more ZP-SRS resources.

28. The apparatus of claim 26, wherein the UE capability indication includes a combined indication of a second UE capability associated with measuring both the one or more ZP-SRS resources and one or more CSI-RS resources.

29. The apparatus of claim 16, further comprising a transceiver coupled to the at least one processor, wherein each interference hypothesis in the two or more interference hypotheses corresponds to a transmitted precoding matrix indicator (TPMI).

30. A method of wireless communication at a network node, comprising:

transmitting, to a user equipment (UE), a channel state information (CSI)-reference signal (RS) (CSI-RS);

receiving, from the UE, an enhanced channel state feedback (eCSF) based on one or more eCSF parameters, the one or more eCSF parameters being based on a cross-link interference (CLI) channel state, a downlink channel state, two or more interference hypotheses, a CSI processing unit (CPU) specification, and at least one of a timing specification, or a UE capability indication, the CLI channel state being based on a zero power (ZP)-sounding reference signal (SRS) (ZP-SRS) from a second UE, the downlink channel state being based on the CSI-RS, wherein the CPU specification indicates a number of CPUs that is based on a product of a number of CSI-RS resources and a number of the two or more interference hypotheses or based on a sum of the number of CSI-RS resources and a predefined number; and transmitting, to the UE, a physical downlink shared channel (PDSCH) transmission based on the eCSF.

* * * * *